Aug. 30, 1955

E. L. CLINE 2,716,339

HYDRAULIC DYNAMOMETER

Filed Aug. 30, 1943

Inventor

Edwin L. Cline

By Bacon + Thomas

Attorneys

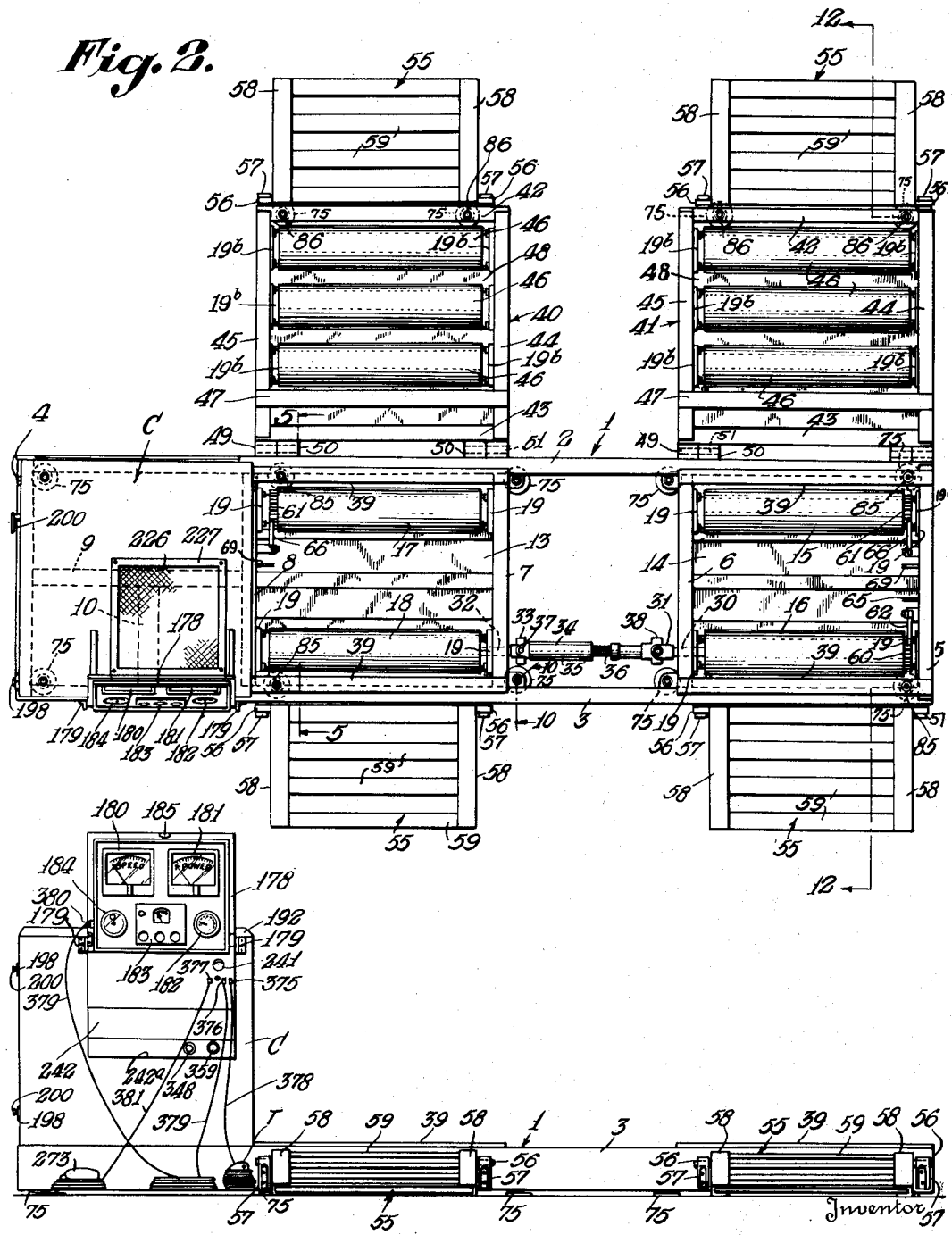

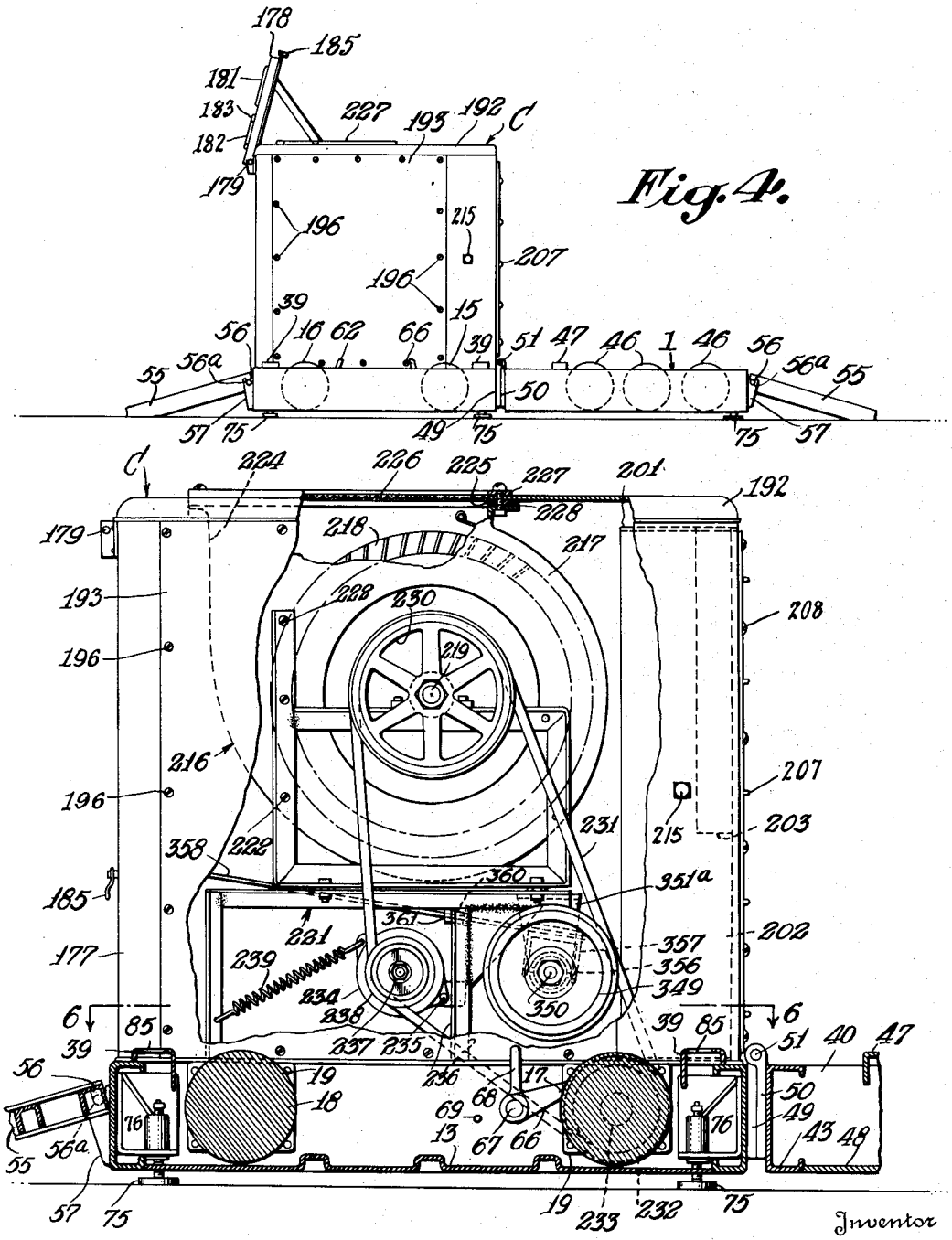

Aug. 30, 1955    E. L. CLINE    2,716,339
HYDRAULIC DYNAMOMETER
Filed Aug. 30, 1943    13 Sheets-Sheet 4

Inventor
*Edwin L. Cline*
By *Bacon + Thomas*
Attorneys

Aug. 30, 1955    E. L. CLINE    2,716,339
HYDRAULIC DYNAMOMETER
Filed Aug. 30, 1943    13 Sheets-Sheet 5

Inventor
Edwin L. Cline
By Bacon + Thomas
Attorneys

Aug. 30, 1955 E. L. CLINE 2,716,339
HYDRAULIC DYNAMOMETER
Filed Aug. 30, 1943 13 Sheets-Sheet 6

Inventor
Edwin L. Cline
By Bacon + Thomas
Attorneys

Aug. 30, 1955 — E. L. CLINE — 2,716,339
HYDRAULIC DYNAMOMETER
Filed Aug. 30, 1943 — 13 Sheets-Sheet 7

Inventor
Edwin L. Cline
By Bacon + Thomas
Attorneys

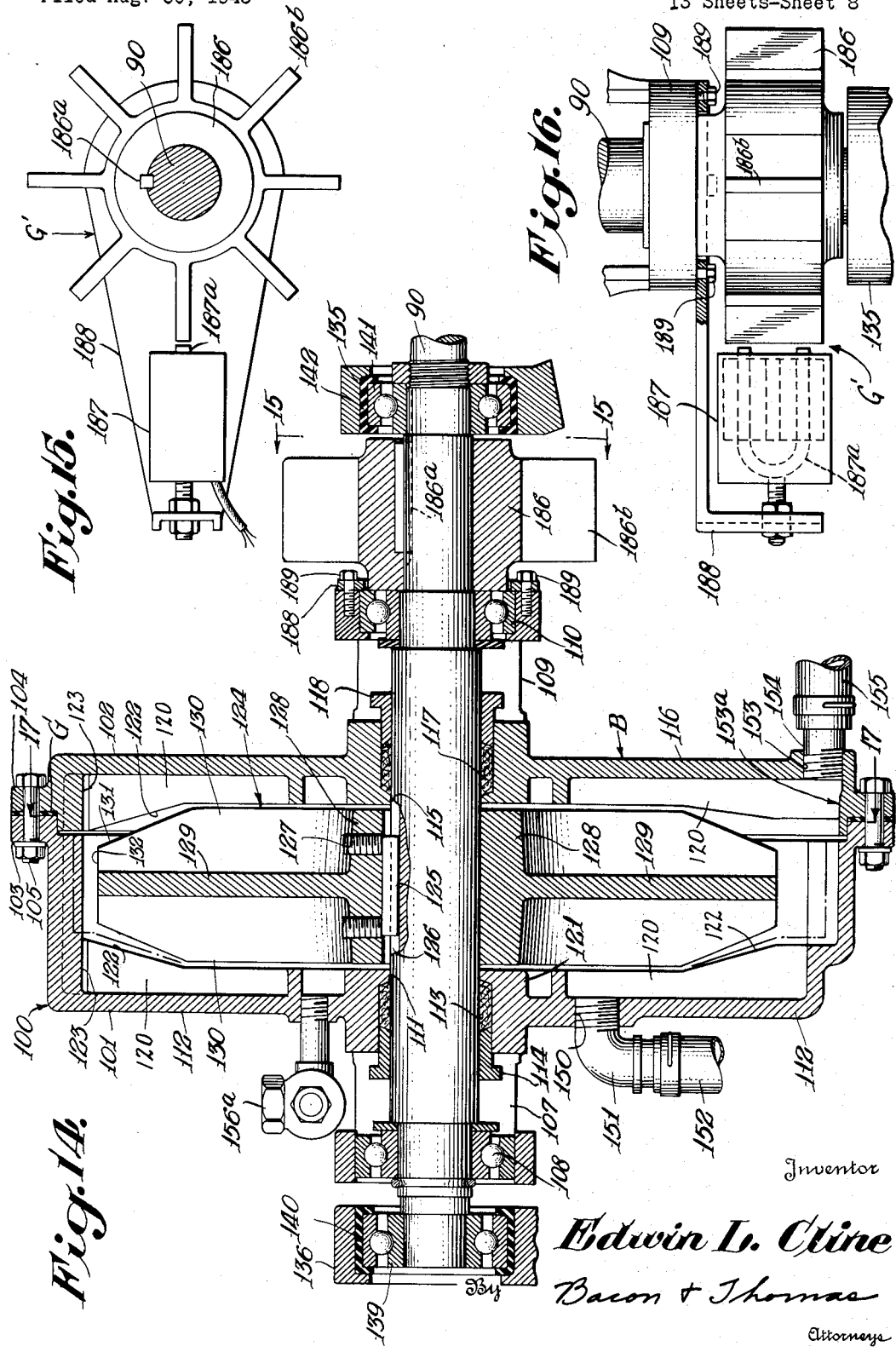

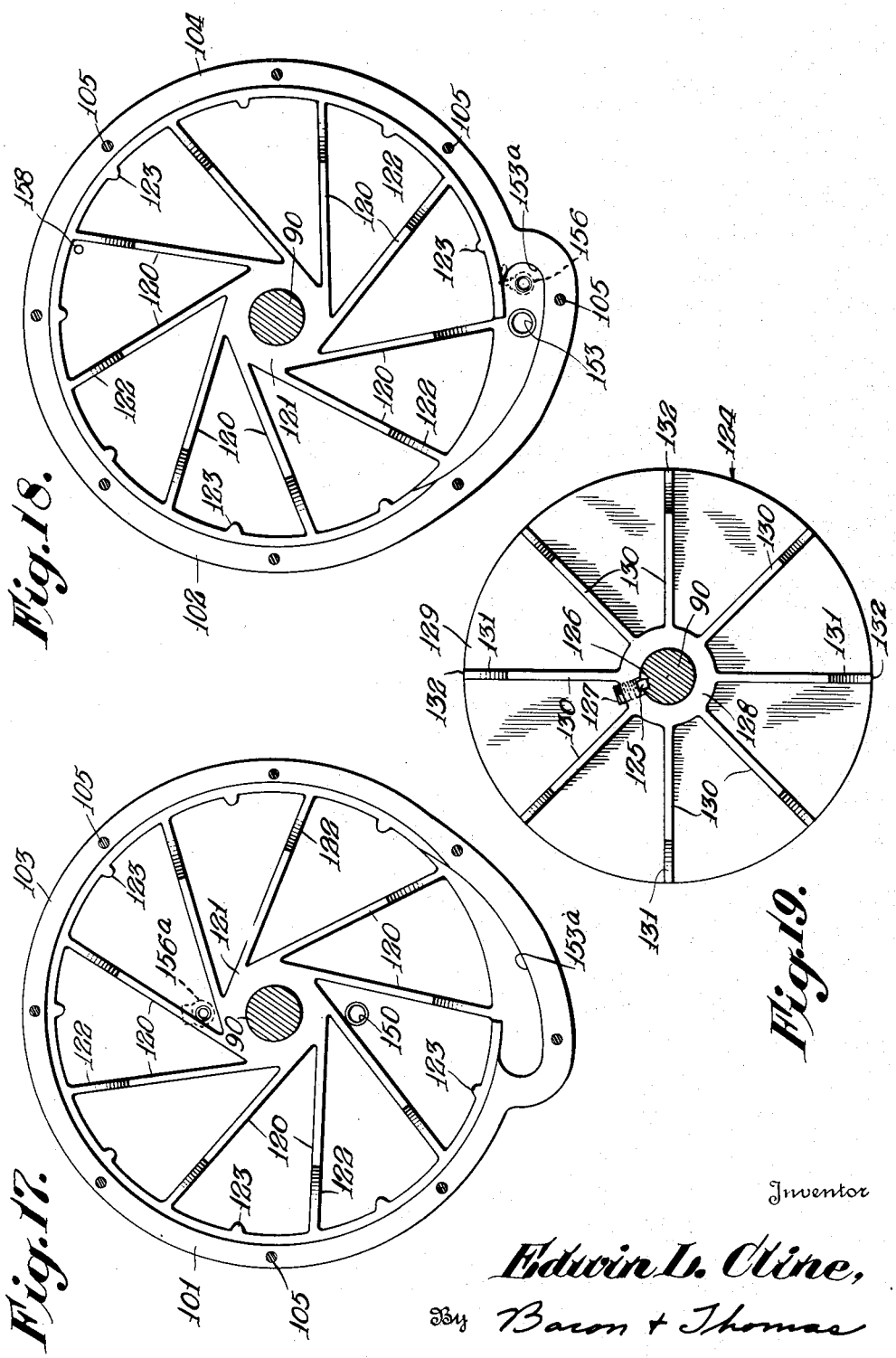

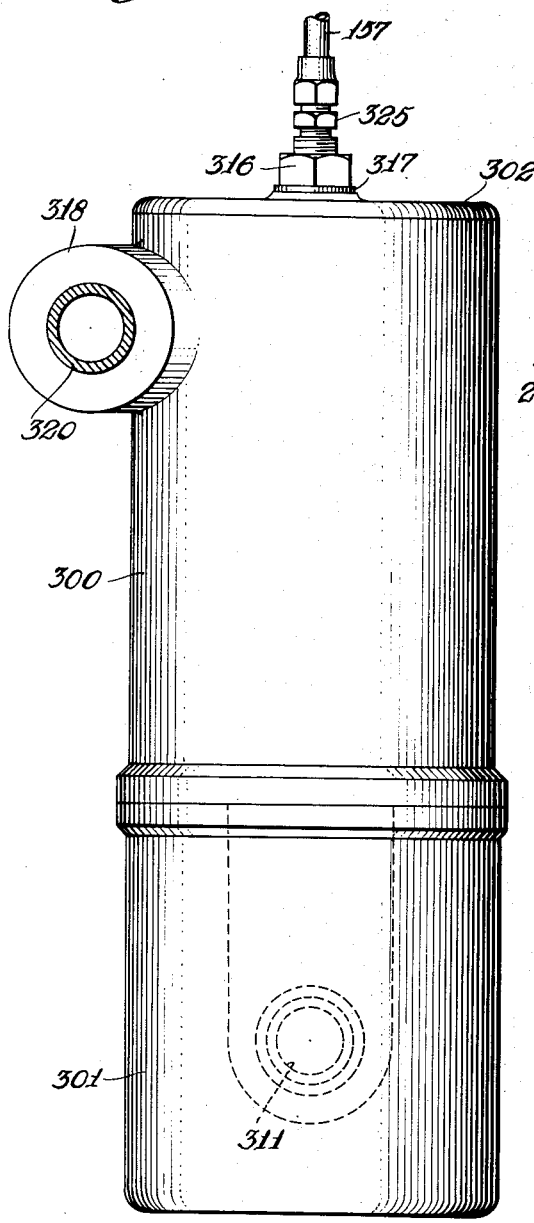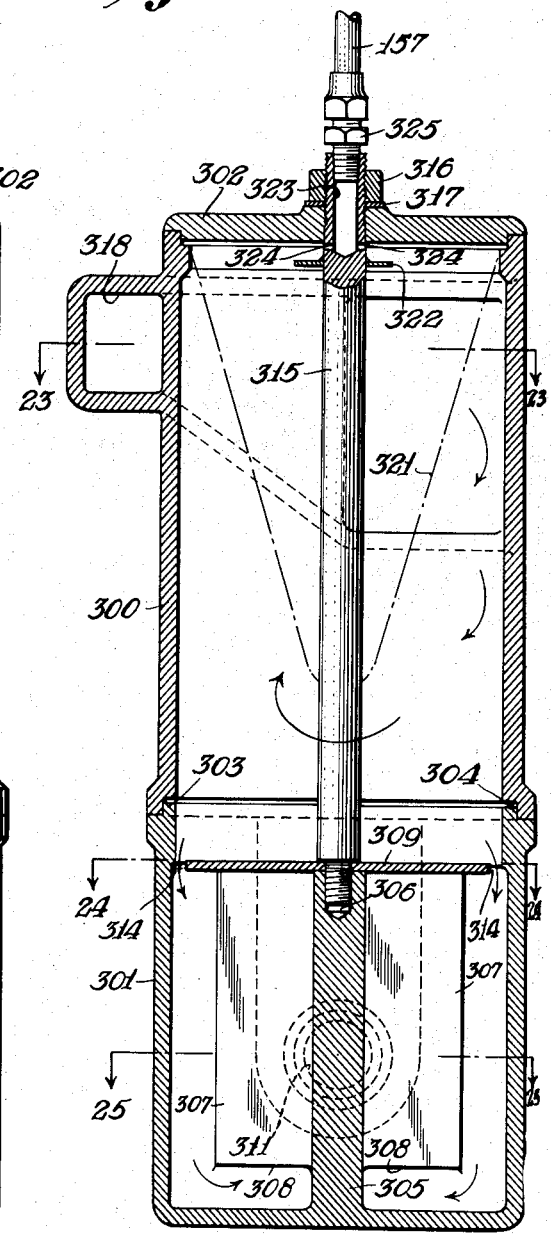

Aug. 30, 1955  E. L. CLINE  2,716,339
HYDRAULIC DYNAMOMETER
Filed Aug. 30, 1943  13 Sheets-Sheet 11
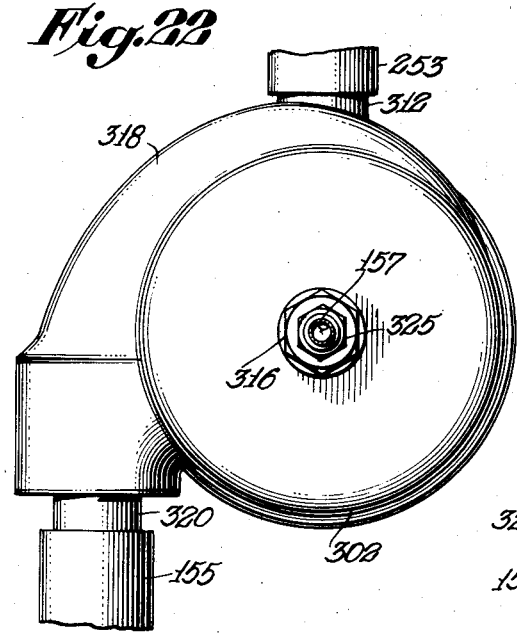
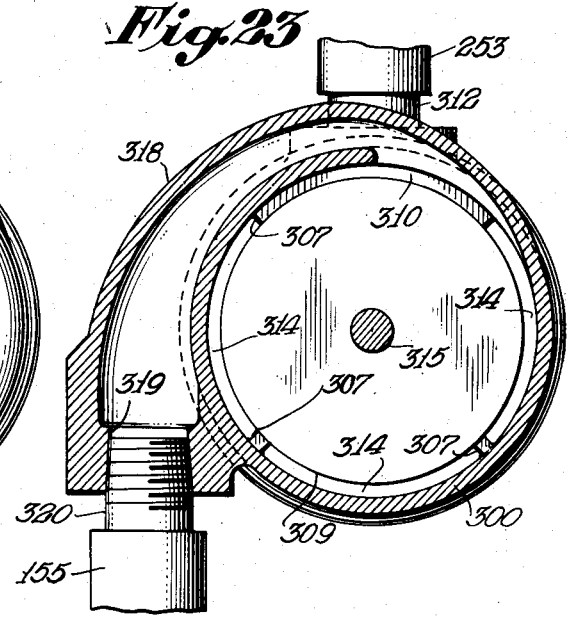
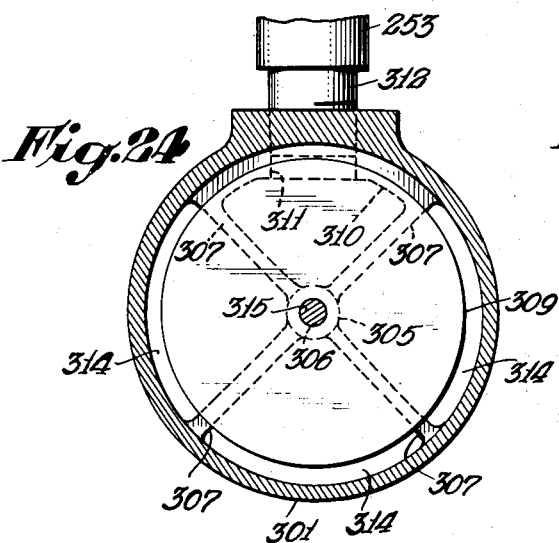
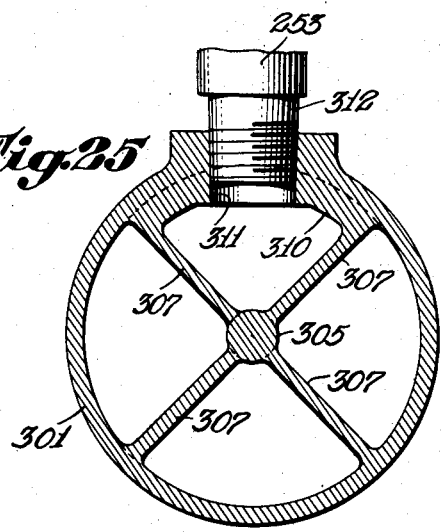
Inventor
Edwin L. Cline
By Bacon + Thomas
Attorneys United States Patent Office 2,716,339
Patented Aug. 30, 1955

2,716,339
HYDRAULIC DYNAMOMETER
Edwin L. Cline, Pasadena, Calif., assignor to Clayton Manufacturing Company, Alhambra, Calif., a corporation of California Application August 30, 1943, Serial No. 500,591
29 Claims. (Cl. 73—117)

The present invention relates to hydraulic dynamometer apparatus for general use in testing the running gear of motor vehicles and/or determining engine performance.

This invention also embodies a number of features, including a deaerator, not disclosed in my copending application Serial No. 443,833, filed May 20, 1942, now Patent 2,452,550, and entitled "Hydraulic Dynamometer." The deaerator is claimed per se in my copending application Serial No. 624,892, filed October 26, 1945, now Patent 2,590,754, and entitled "Deaerating Apparatus."

The principal object of the invention is to provide a portable, self-contained chassis dynamometer that requires no water, sewer or electrical service connections for its operation.

Another object of the invention is to provide a chassis dynamometer which may be set up for use in any area, regardless of ground conditions such as sand, soft earth, etc., and which can also be set up on a hard floor and accurately leveled up by adjustable mounting feet.

Another object of the invention is to provide a chassis dynamometer having bogie wheel supports enabling the same to test motor trucks or other vehicles of the six-wheel type, in addition to testing all types of four-wheel motor vehicles.

Another object of the invention is to provide a chassis dynamometer of the hydraulic type suitable for testing all types of motor vehicles under conditions simulating as nearly as possible those encountered on the road.

Another object of the invention is to provide dynamometer apparatus in which the load absorption capacity of the brake unit can be maintained constant, and which capacity can be varied at will by the dynamometer operator, preferably by an electrical remote control device which can be conveniently held in the hand and actuated by the operator while seated behind the steering wheel or standing beside the vehicle.

Another object of the invention is to provide dynamometer apparatus for testing the engines of motor vehicles and in which it is unnecessary to drain the radiator of the engine undergoing test of anti-freeze solutions or rust inhibitors, with their consequent loss, contamination or dilution.

Still another object of the invention is to provide dynamometer apparatus including an automatic, thermostatically controlled, auxiliary "closed" cooling system for the engine undergoing test, so that engine temperatures comparable to those experienced on the highway are reproduced for various speeds and under various conditions of load and acceleration.

A further object of the invention is to provide a "closed" circulating and cooling system for the brake liquid, wherein heat exchange means is provided for effectively cooling said liquid.

A still further and very important object of the invention is to provide means for removing air from the fluid of the brake unit, whereby more accurate test results can be obtained because of the elimination of air in the flow of fluid to the brake unit.

Still another object of the invention is to provide a deaerating device for removing air from a hydraulic brake unit, and which deaerating device is adapted to be interposed between said hydraulic brake unit and a heat exchanger.

A further object of the invention is to provide a chassis dynamometer having ramps arranged so that the vehicle to be tested can be either driven forwardly onto the testing rolls or backed off said testing rolls.

Another object of the invention is to provide a self-contained chassis dynamometer unit in which all equipment, including speed and power indicating instruments, a cooling system embodying a heat exchanger for the liquid of the hydraulic brake unit, and an auxiliary cooling system having a heat exchanger incorporated therein for the radiator liquid of the engine undergoing test, are built into one assembly.

Another object of the invention is to provide a self-contained dynamometer unit including a sump or storage tank for excess brake liquid, and a storage battery and generator for providing the necessary voltage for operating a circulating pump and certain solenoid control valves.

A still further object of the invention is to provide a chassis dynamometer which is very compact and can be readily transported on a trailer or on a conventional truck from one locality to another.

A still further object of the invention is to provide a chassis dynamometer construction which is relatively simple and which can be manufactured at a reasonable cost.

Other objects of the invention will be apparent from the following description, taken in conjunction with the accompanying drawings, in which:

Figure 2 is a plan view of the chassis dynamometer with the bogie wheel supports and the ramps positioned ready to receive a vehicle to be tested;

Figure 3 is a front elevational view of the chassis dynamometer;

Figure 4 is a right end elevational view of the chassis dynamometer;

Figure 5 is an enlarged sectional view taken on the line 5—5 of Fig. 2, with portions of the cabinet containing the brake unit, heat exchangers, etc., broken away to illustrate the manner in which a suction blower, circulating pump and generator are driven from one of the idler rolls;

Figure 14 is an enlarged sectional view through the brake unit taken on the line 14—14 of Figure 6;

Figure 15 is a sectional view taken on the line 15—15 of Figure 14, illustrating the unique generator employed for generating voltage to actuate the speed and horse power meters;

Figure 16 is a plan view of the generator shown in Figure 15;

Figure 17 is a vertical sectional view through the brake unit taken on the line 17—17 of Figure 14 showing the vane arrangement in one of the sections of the hydraulic brake housing;

Figure 18 is a similar view showing the vane arrangement in the other of the sections of said brake housing;

Figure 19 is a side elevational view of the rotor of the hydraulic brake unit;

Figures 1, 27:
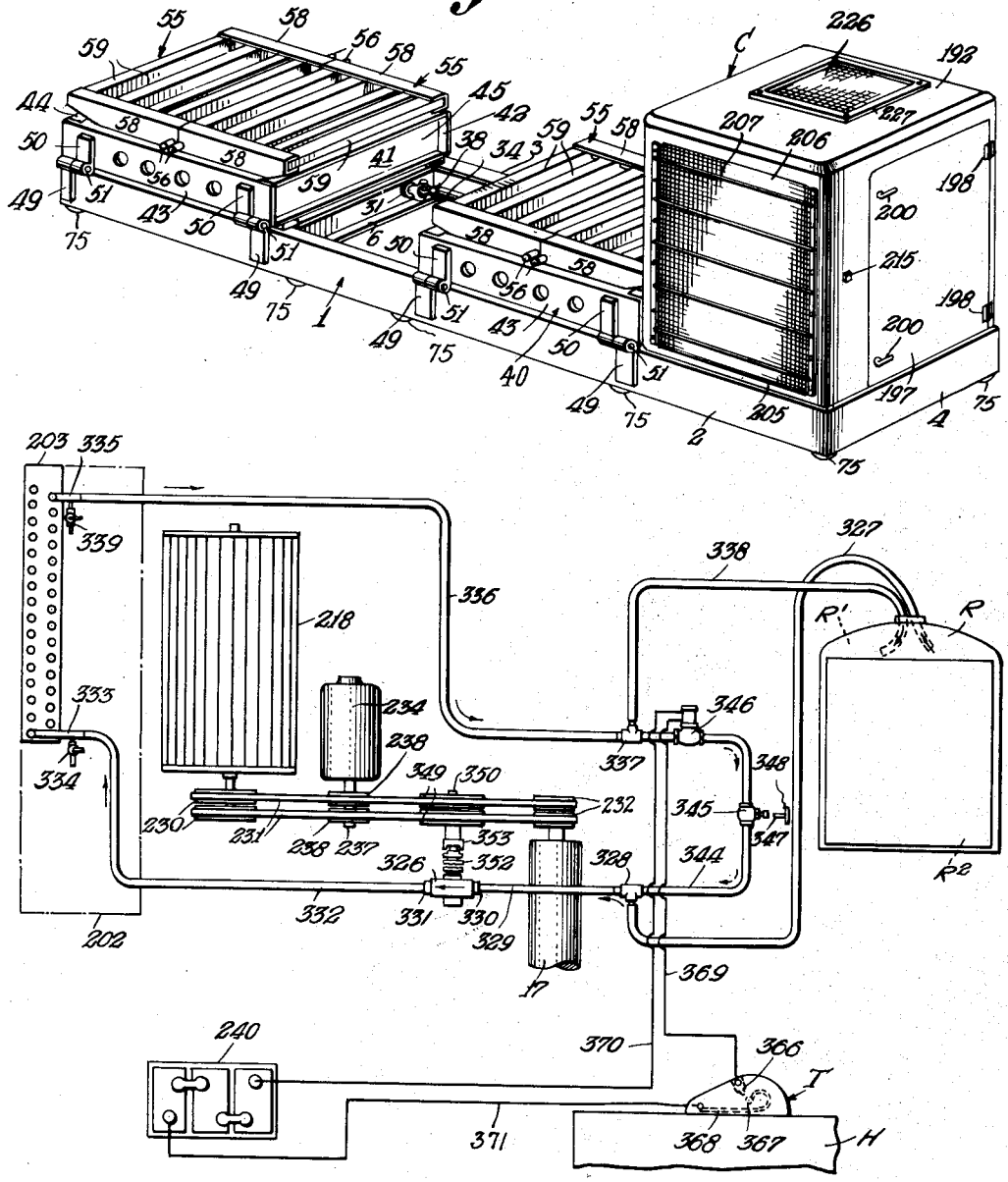
Figure 1 is a perspective view of a chassis dynamometer constructed in accordance with the principles of the present invention and particularly showing the compact manner in which the parts may be arranged for transportation from one locality to another.
Figure 26:
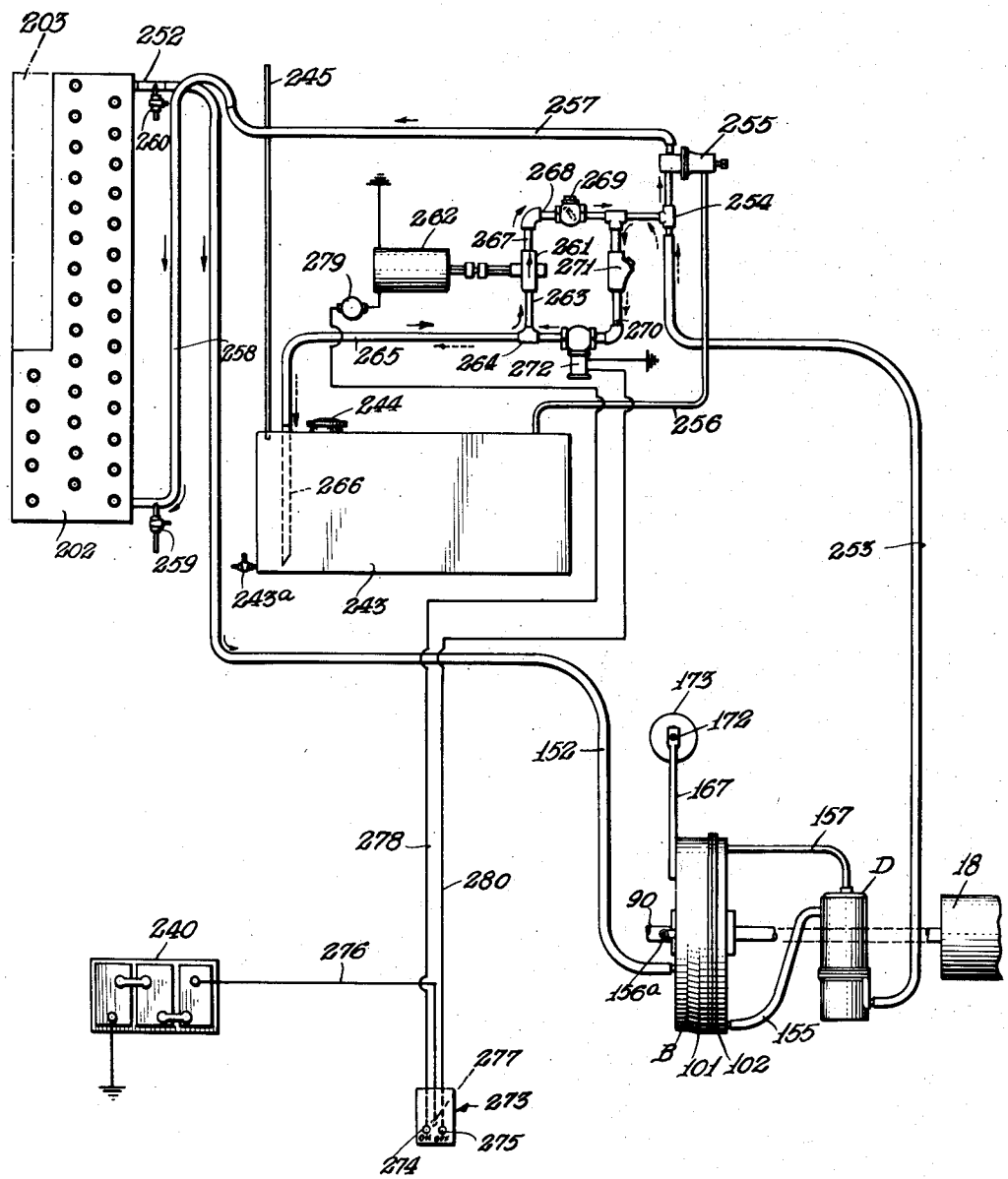

Figures 20 to 25, inclusive, illustrate the details of the deaerating device which is interposed between the hydraulic brake unit and the heat exchanger for cooling the brake liquid. More specifically, Figure 20 is an elevational view of the deaerator; Figure 21 is a longitudinal sectional view through the deaerator; Figure 22 is a plan view of the deaerator; Figure 23 is a horizontal sectional view taken on the line 23—23 of Figure 21 and particularly illustrating the shape of the inlet opening of the deaerator; Figure 24 is a sectional view taken on the line 24—24 of Figure 21 and illustrating the manner in which baffle means is employed to prevent the liquid from passing directly toward the outlet of the deaerator; and Figure 25 is a sectional view taken on the line 25—25 of Figure 21, particularly showing the arrangement of the vanes in the lower section of the deaerator for converting the whirling movement of the liquid in the deaerator into downward substantially straight line movement;

Figure 26 is a diagrammatic view illustrating the closed circulating system for cooling the liquid of the brake unit and the remote control means for effecting loading and unloading of said brake unit;

Figure 27 is a similar view illustrating the closed auxiliary cooling system for cooling the radiator liquid of the vehicle undergoing test and the thermostat for automatically controlling the temperature of the liquid in said radiator.

Figure 28:
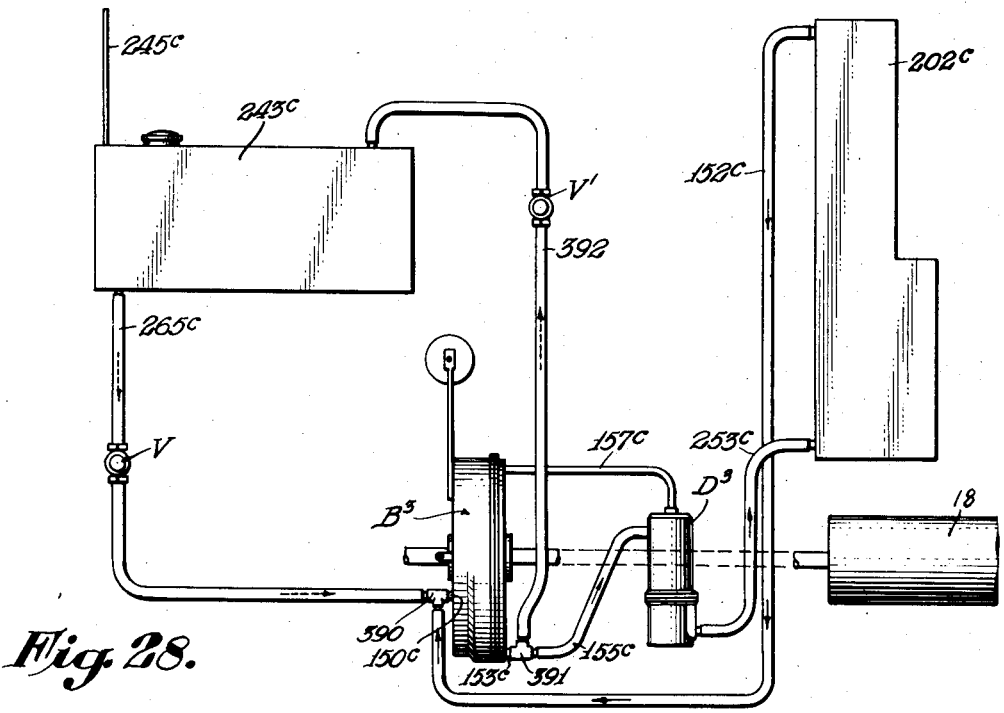
Figure 29:
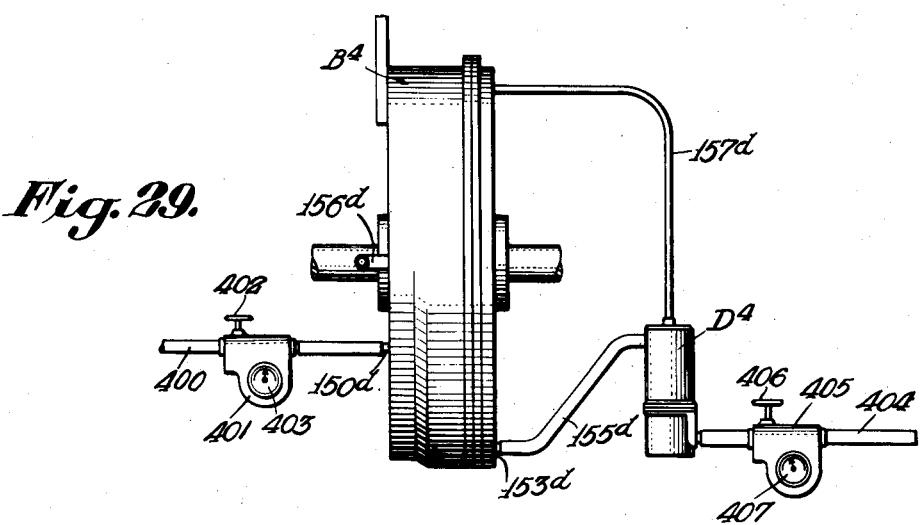

Figure 28 illustrates a modification of the invention in which the pump for loading the hydraulic brake unit has been eliminated and a gravity feed employed for loading said brake unit; and Figure 29 illustrates a further modification of the invention in which the deaerator is employed with a hydraulic brake unit of very high capacity having flow regulating and indicating means on both the inlet and outlet sides thereof to enable the accurate maintenance of a given constant load on said brake unit.

Figure 12:
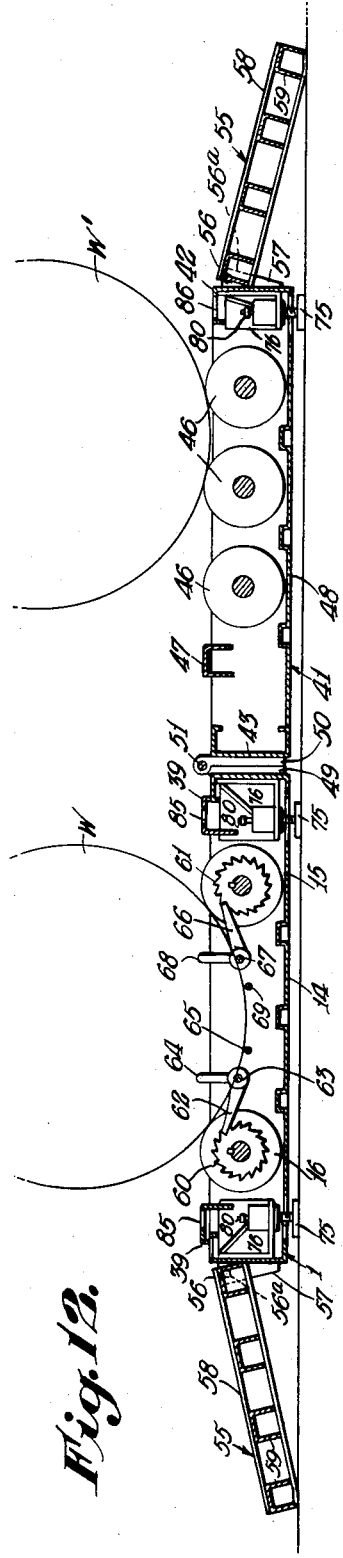
Figure 12 is a sectional view taken on the line 12—12 of Figure 2, particularly illustrating the pawl and ratchet mechanism employed for facilitating the driving of a vehicle off the dynamometer rolls.

Referring now to Figures 1 to 4 of the drawings, the chassis dynamometer apparatus constituting the present invention comprises a rectangular frame which is generally identified by the numeral 1. The frame 1 includes longitudinally extending side members 2 and 3 spaced apart and interconnected by transverse end members 4 and 5 and three intermediate transverse members 6, 7 and 8. All of the members 2 to 8 are preferably made of structural steel, generally channel or C-shaped in cross-section. The end transverse member 4 and the adjacent intermediate transverse member 8 are connected by a longitudinally extending channel section 9 (Fig. 2), and the channel section 9 is connected to the side member 3 by a short transverse strut 10. The space between the side frames 2 and 3 and the transverse members 4 and 8 is closed at the lower side of the frame 1 by a plate 11 (Figs. 7 and 9) containing stiffening corrugations 12. Similarly, the space between the side members 2 and 3 and the transverse members 7 and 8 is closed by a corrugated plate 13 (Figs. 2 and 5) and the space between said side members and the transverse members 5 and 6 is closed by a corrugated plate 14 (Figs. 2 and 12). The purpose of the corrugated plates 11, 13 and 14 is to provide adequate bearing surface for the testing apparatus when used in the open country where the ground may be sandy, soft, or even muddy. In addition to providing suitable bearing surfaces, the plates 11, 13 and 14 prevent dirt or other material from fouling the apparatus. All of the parts 2 to 14, inclusive, are preferably made of steel, welded together, and provide a substantially stiff frame structure. However, it will be understood that these parts may be riveted or otherwise secured together, if desired.

A pair of rolls 15 and 16 (Fig. 2) is mounted horizontally and parallel within the frame 1 between the transverse members 5 and 6. These rolls are preferably balanced so as to avoid dynamic vibration during rotation. A similar pair of rolls 17 and 18 is mounted between the transverse members 7 and 8.

Figure 6:
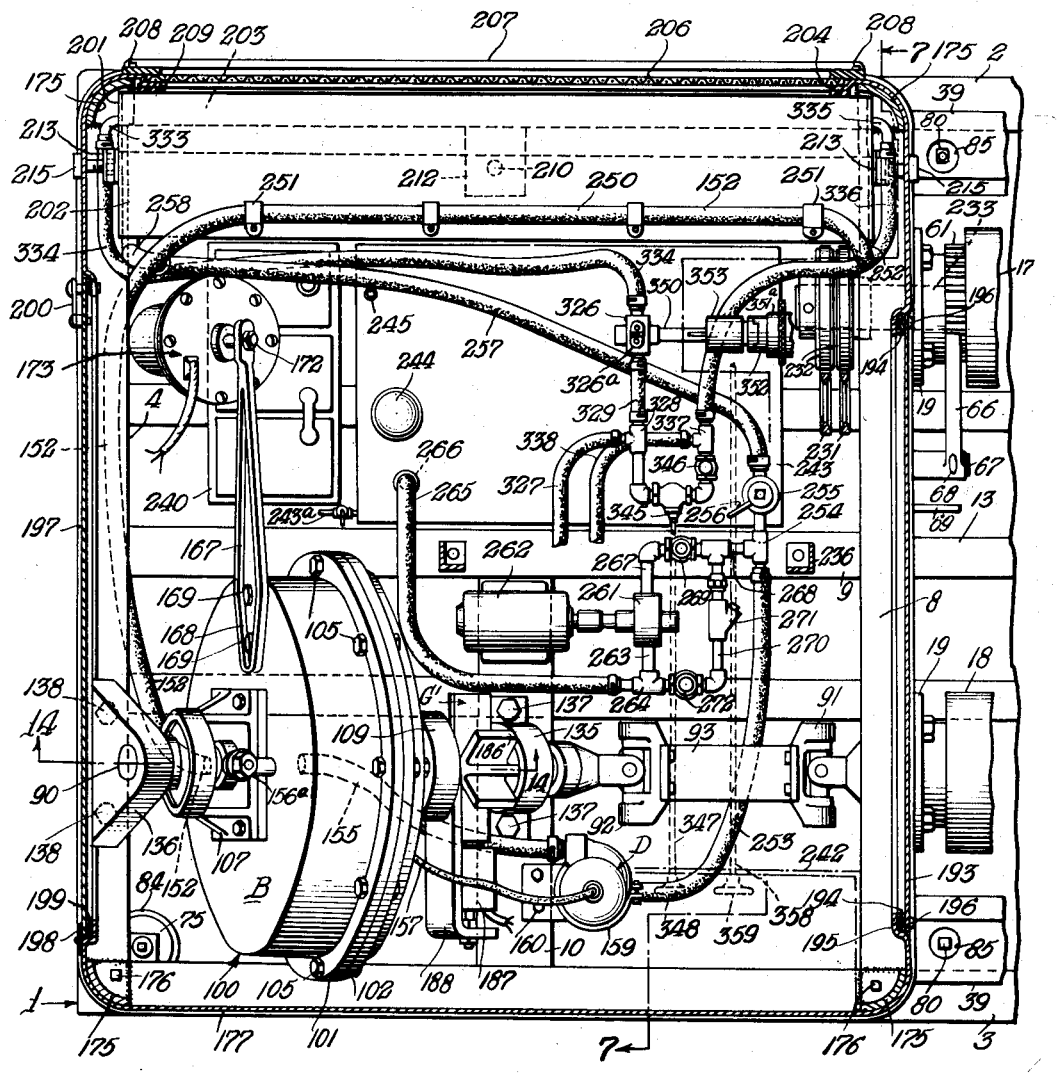
Figure 6 is a view partly in section taken on the line 6—6 of Figure 5, particularly illustrating the various hose connections between the deaerator and the heat exchanger associated with the brake unit and the circulating pump and the auxiliary heat exchanger for cooling the radiator liquid of the engine undergoing test.

The rolls 15 and 17 are idler rolls and are supported at their opposite ends in suitable bearing blocks 19 bolted or otherwise secured to the transverse members 5 to 8. The rolls 16 and 18, on the other hand, serve as drive or power takeoff rolls for transmitting the power from the rear wheels of a motor vehicle to a hydraulic brake or power absorption unit generally identified by the letter B (Fig. 6). The drive rolls 16 and 18 are also supported in bearing blocks 19 suitably secured to the transverse members 5 to 8.

Figure 9:
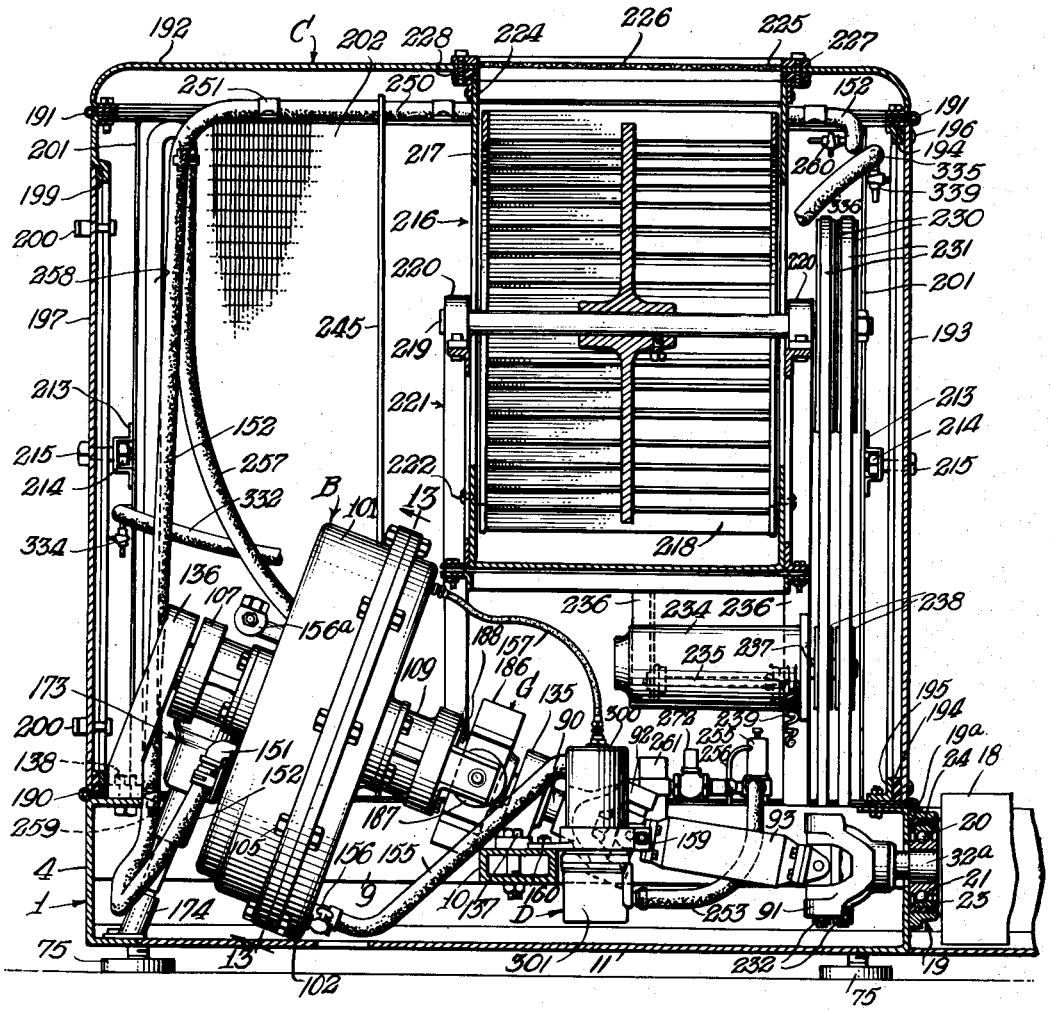
Figure 9 is a view taken on the line 9—9 of Figure 7, showing the brake unit in elevation and the suction blower in cross section.

Figure 9 illustrates the details of construction of the bearing blocks 19. All of the bearing blocks 19 are similar in construction, and hence a description of one will suffice for all. Each of the bearing blocks 19 includes a ball bearing 20, the inner race element 21 of which is carried on a reduced extension of the rolls 15 to 18 and the outer race element 23 of which is received in a suitable rubber grommet 24 carried by the housing 19a of the bearing block 19 and serving as an insulating material. As is shown, the grommet 24 is generally U-shaped in cross section and partially surrounds the outer race element 23. The use of the rubber-mounted ball bearings at the opposite ends of the rolls 15 to 18 permits self-aligning of the bearings, as when the dynamometer frame 1 is slightly flexed in use due to irregularities in the surface upon which it is resting. The rubber mounting is also conducive to quiet operation of the rolls.

An extension 30 (Fig. 2) on the drive roll 16 projects through a bearing block 19 and carries one element 31 of a universal joint. Similarly, an extension 32 on the drive roll 18 projects through a bearing block 19 and carries one element 33 of a universal joint. The extensions 30 and 32 are interconnected by a shaft 34 including splined telescopically arranged sections 35 and 36. The shaft section 35 carries an element 37 of a universal joint which is operatively connected with the element 33 and the shaft section 36 carries an element 38 of a universal joint which is operatively connected with the element 31. Thus, the two drive rolls 16 and 18 are interconnected by the shaft 34 through the two universal joints 33—37 and 31—38.

It will be apparent that, by using short drive rolls 16 and 18 and short idler rolls 15 and 17, instead of a pair of long rolls, heavier vehicles can be tested and substantially all flexing of the rolls due to the weight of the vehicle being tested is eliminated.

Channel-shaped strips 39 (Figs. 2 and 5) are inverted and welded onto the frame 1 between the transverse members 5—6 and 7—8 and stiffen the construction. The upper surface of the strips 39 lies in a horizontal plane substantially common with that of the crown of the rolls 15 to 18, as will be apparent from Fig. 5.

In order to adapt the dynamometer apparatus for testing vehicles having four rear wheels, a pair of bogie wheel supporting frames 40 and 41 (Fig. 2) are provided. Each of the bogie frames 40 and 41 comprises side members 42 and 43 and end members 44 and 45, all preferably made of channel-shaped steel sections and welded together. Each of the bogie frames 40 and 41 carries three idler rolls 46 which may be mounted on the side frame members 44 and 45 in bearing blocks 19ᵇ similar to the bearing blocks 19. The end members 44 and 45 are interconnected by a longitudinal, inverted channel-shaped member 47 (Figs. 2 and 12), the extreme ends of which rest upon the upper side of said end members 44 and 45 and are preferably welded thereto. The member 47 serves as a support enabling a vehicle wheel to easily traverse the space between the side member 43 and the nearest of the rolls 46. The space between the side members 42 and 43 and the end members 44 and 45 at the lower side of each of the bogie frames 40 and 41 is closed by a corrugated plate 48 (Figs. 2 and 12) similar to the plates 13 and 14 arranged below the rolls 15—16 and 17—18. The purpose of the plates 48 is to provide ample bearing area for the bogie frames 40 and 41 with the apparatus is used in the open field.

The bogie frames 40 and 41 are pivotally connected with the side member 2 of the main frame 1 by hinge elements 49 (Fig. 1) welded to the side frame member 2 and hinge elements 50 welded to the side members 43 of the bogie frames, the elements 49 and 50 being interconnected by a pin 51. The bogie frames 40 and 41 may be detached from the main frame 1 by removing the pins 51, if desired.

Four ramps 55 (Fig. 2) are provided to enable a vehicle to be driven forwardly onto the rolls 15 to 18 or to be backed onto said rolls. Each of the ramps 55 is provided with a pair of pins 56 adapted to be received in suitable sockets 56ᵃ (Fig. 12) formed in the upper end of spaced brackets 57, four of which are bolted onto the side frame member 3 and two of which are bolted to each of the side members 42 of the bogie frames 40 and 41. The pins 56 are carried by U-shaped end sections 58 of the ramps 55, and these sections are interconnected by a series of inverted U-shaped longitudinally extending channel sections 59, all of said parts being preferably welded together.

Figure 2 illustrates the dynamometer apparatus with the bogie frames 40 and 41, and ramps 55 in the position that they assume relative to the main frame 1 and the apparatus is set up for use. If it is desired to move the dynamometer apparatus to another site, the ramps 55 can be readily detached from the main frame 1 and from the bogie frames 40 and 41 by simply lifting the pins 56 out of the retaining sockets 56a. The bogie frames 40 and 41 can then be swung about the hinge pins 51 over onto the main frame 1 to the position shown in Figure 1, and a pair of ramps 55 placed upon each of said bogie frames and the unit is then quite compact and ready to be transported to the desired destination.

Referring now to Figures 2 and 12, ordinarily no difficulty is encountered in driving a vehicle onto the rolls 15 to 18 carried by the main frame 1. However, unless some means is provided for locking said rolls against rotation, difficulty is encountered in driving the vehicle off said rolls. This difficulty is overcome in the present construction by associating a ratchet wheel 60 with the interconnected rolls 16 and 18 and a ratchet wheel 61 with each of the rolls 15 and 17 so that the ratchet wheels rotate with said rolls. A pawl 62 is pivotally mounted upon a pin 63 carried by the transverse frame member 5 and is arranged so that it can be engaged with the ratchet 60 to prevent clockwise rotation of the roll 16, as viewed in Figure 12. An operating handle 64 is connected with the pawl 62 for effecting disengagement thereof from the ratchet 60 when the apparatus is in use. The handle 64 is adapted to rest against a stop pin 65 mounted on the transverse member 5 when the pawl 62 is retracted. A pawl 66 is adapted to cooperate with each of the ratchet wheels 61 to prevent rotation of the rolls 15 and 17, respectively. The pawls 66 are pivotally carried by pins 67 mounted on the transverse members 5 and 8, respectively, and a handle 68 secured to each of said pawls, is adapted to engage a stop pin 69 when the pawls 66 are moved to their retracted position, as when the apparatus is in use. It will be apparent that, when the pawl 62 is engaged with the ratchet wheel 60, the rolls 16 and 18 will be held against clockwise rotation and the vehicle undergoing test may be readily driven forwardly off said roll. It will also be apparent that when the pawls 66 are engaged with the ratchet wheel 61, the rolls 15 and 17 will both be held against counterclockwise rotation and the vehicle may be readily backed off said roll. Thus, when the pawls 62 and 66 are engaged, a vehicle may be either driven forwardly off the rolls 15 to 18 or backed off said rolls.

Figure 10:
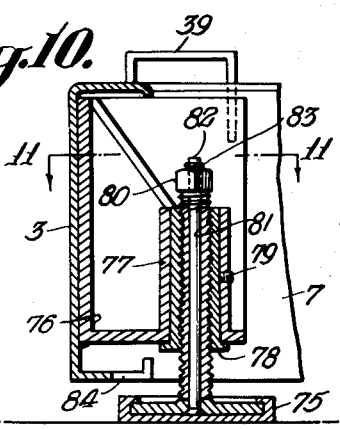
Figure 10 is a vertical sectional view taken on the line 10—10 of Figure 2 showing the details of one of the frame mounting feet.
Figure 11:
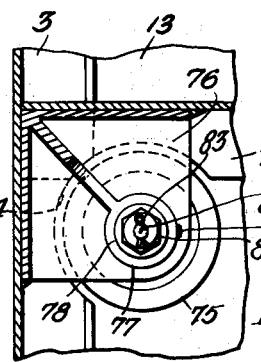
Figure 11 is a horizontal sectional view taken on the line 11—11 of Figure 10.

The present dynamometer, in addition to being adapted for use in an open field as stated hereinbefore, is adapted to be set up on a hard surface, such as a concrete floor. To this end, means is provided in the form of adjustable feet 75 (see Figs. 2, 10 and 11); five pairs of feet being mounted upon the frame 1 and one pair of feet being mounted upon the free side of each of the bogie frames 40 and 41. Inasmuch as the mounting means for all of the feet 75 is substantially identical, the description of one will suffice for all. Referring now to Figs. 10 and 11, a bracket 76 serves as a mounting means for securing the feet 75 to the main frame 1 or to the bogie frames 40 and 41, as the case may be. The bracket 76 is welded or otherwise secured in place and includes a vertical boss 77 containing an internally threaded cylindrical sleeve 78 secured in the boss 77 by a set screw 79. A bolt 80 is threaded into the sleeve 78 and is provided with a longitudinal passageway 81 for the reception of a stem 82 which is secured to one of the feet members 75. A cotter pin 83 projects through the stem 82 at a point above the head of the bolt 80 to maintain the foot member 75 in assembled relation with the bolt 80, while permitting rotation of said bolt without turning of said foot member.

It will be apparent that a socket wrench (not shown) or any other suitable means may be applied to the head of the bolt 80 to turn the same to elevate the frame 1 (or the free side of the bogie frames 40 and 41) to any desired height relative to the floor. In setting up the chassis dynamometer for use on a hard surface, the feet at the extreme ends of the main frame 1 are first adjusted so that the frame is level and clears said surface by at least ¼" and then the intermediate feet on said frame are adjusted. Finally the feet on the bogie frames 40 and 41 are adjusted. In each instance, the frame member with which a foot 75 is associated is suitably recessed as indicated, for example, at 85 to permit the feet 75 to be retracted to a height above the lower surface of the frame member when the apparatus is to be used resting directly upon the earth. In order to provide access to the bolts 80 at the right end of the rolls 15 and 16 and at the left end of the rolls 17 and 18, openings 85 (Figs. 2, 5 and 12) are provided in the longitudinal strips 39 in order that a wrench may be inserted therethrough. Similar openings 86 (Figs. 2 and 12) are provided in the side frame members 42 of the bogie frame 40 and 41.

Referring now to Fig. 9, it will be noted that the drive roll 18 has a reduced portion 32ᵃ which is connected with a shaft 90 of the brake unit B by universal joints 91 and 92 and a shaft 93 disposed between said universal joints.

The details of the brake or power absorption unit B of the dynamometer are best illustrated in Figs. 6, 7, 9, 14, 17, 18 and 19. This unit includes a drum-like casing or housing 100 consisting of two sections 101 and 102 having annular portions terminating in radially extending flanges 103 and 104, respectively, suitably apertured to receive bolts 105 which hold the sections together. A suitable gasket material G (Fig. 14) is disposed between the confronting faces of said flanges 103 and 104 to form a seal.

The shaft 90 extends through both housing sections 101 and 102. The section 101 carries a bracket 107 in which is mounted a ball bearing 108 providing a support for one end of the shaft 90 and the section 102 carries a somewhat similar bracket 109 in which is mounted a ball bearing 110 forming a support for the opposite end of said shaft. The shaft 90 extends through an opening 111 in the side wall 112 of the section 101 and is surrounded by packing 113 held in place by a packing gland 114. The shaft 90 also extends through an opening 115 in the side wall 116 of the casing section 102 and is surrounded by a packing 117 held in place by a gland 118. Thus, the shaft 90 is packed in each of the housing sections 101 and 102 so that no fluid can escape from the housing 100 along said shaft.

Each of the housing sections 101 and 102 is provided with integral vanes 120 (see Figs. 17 and 18) extending tangentially from a central hub portion 121 to the inner periphery of the annular wall portions of the respective housing sections. It will be observed that nine tangential vanes 120 are provided in each housing section 101 and 102. The vanes 120 are of uniform height for about two-thirds of their length and then increase in height as indicated by the inwardly inclined portions 122 (Fig. 14). In addition to the tangential vanes, each of the housing sections 101 and 102 carries a transverse inwardly extending web 123, one of which is disposed between each two adjacent tangential vanes 120.

A dynamically balanced power absorption rotor or brake wheel 124 (Figs. 14 and 19) is disposed in the housing 100 between the sections 101 and 102 and is secured to the shaft 90 by a key 125 received in a keyway 126 cut in said shaft. Set screws 127 extend through a hub portion 128 of the rotor 124 and retain said rotor in a central position on the shaft 90.

The rotor 124 has a central circular web 129 extending radially from the hub 128 to a point adjacent the innermost edge of the webs 123. Upon each side of the central web 129 is disposed a series of radially extending equally spaced vanes 130, which project from the hub 128 to the periphery of the rotor. The vanes 130 are of uniform height for about two-thirds of their length and then taper, as indicated at 131, toward the peripheral portion of the wheel, as is best shown in Fig. 14, said vanes terminating in end portions 132 flush with the periphery of the central web 129. The tapered portions 131 are disposed at about the same distance from the axis of the shaft 90 as the inwardly inclined portions 122 of the tangential vanes 120. However, as will be observed from Fig. 14, the inclined vane portions 122 and 131 are not parallel but diverge outwardly relative to each other to give more linear action of loading.

The rotor 124 carries eight vanes 130 upon each side of the central web 129. It will therefore be apparent that the brake housing sections 101 and 102 each contain an odd number of vanes 120, to-wit, nine on each side wall, whereas the brake wheel or rotor 124 has an even number of vanes 130, to-wit, eight on each side of the central web 129. For the purposes of the present invention, the relationship could be reversed. That is to say, the rotor 124 could have the odd number of vanes and the casing or housing sections 101 and 102 an even number of vanes. Similarly, the tangential vanes could be formed on the rotor instead of on the housing. The object in having one of the cooperating parts provided with tangential vanes and/or a greater number of vanes than the other is to prevent setting up harmonic vibrations and to reduce the shock and fluctuation that would occur if a number of the vanes on the rotor and housing were simultaneously brought into full confronting relation.

The brake unit 100 is mounted upon the frame 1 by bearing brackets 135 and 136 (Figs. 6 and 9), the bearing bracket 135 being secured to the short transverse frame member 10 by bolts 137 and the bearing bracket 136 being secured to the transverse end member 4 by bolts 138. The bearing brackets 135 and 136 support the brake unit B with the axis of the shaft 90 disposed on an angle relative to the axis of the drive roll 18, as is best illustrated in Fig. 9. The disposition of the shaft 90 upon an angle makes it possible to provide a chassis dynamometer which does not require a pit, or the raising of the dynamometer frame and rolls to a substantial height above the level of the floor or ground. As is best shown in Fig. 14, the outer end of the shaft 90 is received in a ball bearing 139 which is mounted in a rubber grommet or insulator 140 in the bearing bracket 136. The opposite end of the shaft 90 is similarly mounted in a ball bearing 141 and rubber grommet 142 in the bearing bracket 135.

The housing section 101 is provided with a threaded opening 150 (Fig. 14), adjacent the hub 121 or low pressure zone of brake unit B in which is mounted an elbow 151 connected to a hose section 152, whereby water or other suitable brake liquid can be introduced into the housing 100. The housing section 102 has a threaded opening 153 into which is threaded a pipe nipple 154 having one end of a hose 155 connected thereto. The other end of the hose 155 is connected to a deaerating device D (Fig. 9), which in turn is connected to a heat exchanger, both of which will be described more fully hereinafter.

The housing sections 101 and 102 have registering depressions providing a pocket 153ª (Figs. 14, 17 and 18) adjacent the opening 153 to facilitate displacement of the brake liquid during unloading and for circulation to the heat exchanger, referred to above. The hose section 155 serves as an inlet hose for supplying liquid to the heat exchanger through the deaerator D and, in addition, is associated with a built-in liquid supply tank, or sump, and piping system for effecting loading and unloading of the brake unit B, as will also be described more fully hereinafter.

The housing section 102 has a petcock 156 (Fig. 9) mounted therein at the pocket 153ª to permit complete draining of the brake unit, if desired. The housing section 101 has an air check valve 156ª (Fig. 14) mounted in the side wall 112 thereof to permit air to enter the brake unit and prevent the formation of a vacuum therein whenever liquid is drained from the brake unit B.

The deaerating device D is connected by a tube 157 (Figs. 6, 7 and 9) with the housing section 102, the point of connection of said tube with said housing section being at the point indicated by the numeral 158 (Fig. 18) on the leeward side of one of the vanes 120. The tube 157 serves as a means for returning the air separated from the brake liquid (and any entrained moisture that may be in said air) to the housing 100, as will be explained more fully hereinafter. The deaerator D is mounted in a bracket 159 secured to the frame member 10 by bolts 160.

The housing section 101 carries a torque arm 167 (Fig. 6). One end 168 of the torque arm 167 is secured to the housing section 101 by bolts 169 and the opposite end of said torque arm is connected to a rod 172 of a torque bridge device 173 for, in effect, "weighing" the torque produced by the engine undergoing test. The torque bridge device 173 is fully illustrated, described and claimed in my copending application Serial No. 775,765, which is a continuation-in-part of Serial No. 443,833, filed May 20, 1942, Patent 2,452,550 and entitled "Hydraulic Dynamometer," and since said torque bridge device per se forms no part of the present invention, detailed illustration and description thereof herein is deemed unnecessary. However, it will be observed that the lower end of the torque bridge device 173 is connected to the end frame member 4 (Fig. 9) by a suitable bracket 174.

A cabinet generally identified by the letter C is mounted upon the left end of the main frame 1 above the transverse frame members 4 and 8 (Fig. 1), and serves as an enclosure for the brake unit B, the deaerator D and the torque bridge device 173, referred to hereinbefore. The cabinet C comprises arcuate, upright corner posts 175 (Fig. 6) secured by bolts 176 or other suitable means, to the main frame 1. A front wall 177 is welded or otherwise suitably secured to the front posts and includes a section 178 (Fig. 3) mounted upon hinges 179 located at the upper end of said front wall. The section 178 serves as an instrument panel and has mounted thereon a direct reading speed gauge 180, a direct reading horse power gauge 181, a vacuum gauge 182, an exhaust gas analyzer 183 and a control switch plate 184. When the apparatus is in use, the section 178 is turned about its hinges so that it assumes the position shown in Figures 2 to 4 with the instrument dials exposed. However, when the device is not in use, the section 178 normally lies flush with the outer surface of the front panel 177 (see Fig. 7 and is maintained in its closed position by a latch 185.

A generator G' for generating voltage for actuating the direct reading speed and horsepower gauges 180 and 181, respectively, is associated with the brake unit B. The generator G' comprises a rotor 186 keyed to the shaft 90 at 186ª (Fig. 15) and a generator stator coil assembly 187 mounted upon an arm 188, which in turn is secured to the bracket 109 by bolts 189. The generator rotor 186 is provided with eight radially extending arms 186ᵇ which successively pass the ends of a permanent horseshoe magnet 187ª. The rotor 186, in cooperation with the coil assembly 187, generates voltage in proportion to the speed of the dynamometer shaft 90. The generator coil assembly 187 is connected with the torque bridge device 173 and to the speed meter 180 and the horsepower meter 181 by a circuit which is described in detail in my copending application, supra, and therefore need not be described in detail here. However, the meters in question are calibrated and actuated to give a direct reading of the speed in miles per hour and horsepower, respectively, that would be developed by the vehicle under test, if it were operating upon the road. The horsepower meter 181 is calibrated in actual rear wheel horse power with compensation duly made for the power necessary to drive the suction blower, described hereinafter, from the idler roll 17.

The cabinet C is so constructed and mounted upon the frame 1 that it is substantially air-leakproof. Thus, suitable packing means 190 (Fig. 9) is disposed between the lower edges of the cabinet and the top of the frame 1 and similar packing material 191 is disposed between the ends of the vertical walls of the cabinet and the cabinet top 192. A removable panel 193 is provided in the right side wall of the cabinet C to permit access to the apparatus within said cabinet and suitable sealing material 194, such as sponge rubber, is interposed between the marginal portions of the removable panel 193 and a flange 195 serving as a support for said sealing material. A suitable number of screws 196 holds the panel 193 and sealing material 194 in place. Similarly, an access door 197 (Figs. 1, 6 and 9) is mounted on the left side wall of the cabinet by a pair of hinges 198. The door 197 is sealed against air-inleakage by suitable sponge rubber gasket means 199, and a pair of latches 200 carried by the door 197 maintains said door tightly closed.

A metal shell 201 within the cabinet C forms a housing for two radiators or heat exchangers 202 and 203 of any conventional or suitable construction. The heat exchanger 202 serves as a cooling means for the liquid of the hydraulic brake unit B and the heat exchanger 203 serves as an auxiliary cooling means for the radiator liquid of the engine undergoing test, all as will be pointed out more fully hereinafter. The heat exchanger 202 is of much greater capacity than the heat exchanger 203, the former being conveniently stepped or recessed to receive the latter, as diagrammatically shown in Figures 26 and 27. The heat exchangers 202 and 203 are disposed adjacent an opening 204 (Figs. 6 and 7) in the rear wall 205 of the cabinet C. A screen 206 extends across the opening 204 in front of the heat exchangers 202 and 203 and a grill 207 is mounted upon the rear wall 205 by a plurality of screws 208 to protect the screen and heat exchangers from possible damage. Here again, sealing means 209, which may be in the form of sponge rubber, is disposed between the heat exchangers 202 and 203, and the rear wall 205 to provide an air seal.

The shell 201 encasing the heat exchangers 202 and 203 is preferably supported within the cabinet C by a three-point mounting means. Thus, a pointed pin 210 (Fig. 7) depends from the shell 201 and is received in an opening 211 of smaller diameter than said pin formed in a plate 212 welded or otherwise secured to the side member 2 of the main frame 1. The sides of the shell 201 carry brackets 213 (Fig. 9) shaped to receive a nut 214, and a bolt 215 projects through the side walls of the cabinet and is threaded into said nut. Thus, the three-point mounting means for the shell 201 provided by the pin 210 and the bolts 215 enables the heat exchangers 202 and 203 to be readily secured and held in place without any undue strain being placed thereon.

The liquid circulated through the heat exchangers 202 and 203 is cooled by a suction blower 216, also located within the cabinet C. The suction blower 216 comprises a sheet metal casing 217 and a rotor 218 in said casing mounted upon a horizontal shaft 219. The shaft 219 is supported in bearings 220 mounted upon a framework generally indicated by the numeral 221. The blower casing 217 is mounted upon the framework 221 by screws 222 and has an inlet opening 223 (Fig. 7) disposed adjacent the innermost portion of the heat exchanger 202. The casing 217 also has an outlet opening 224 which registers with an opening 225 in the top wall 192 of the cabinet C. A screen 226 extends across the opening 225 and is secured in place by a metal frame 227. Suitable sealing means 228 is disposed between the casing 217 and the inner surface of the cabinet top 192.

The purpose of sealing the cabinet C against air-inleakage, as aforedescribed, is to increase the efficiency of the suction blower 216 so that all of the air drawn into the cabinet C by said suction blower will have to pass through the heat exchangers 202 and 203 and effect the desired degree of cooling of the liquid circulating therethrough.

The shaft 219 of the suction blower 216 carries a pair of pulleys 230 (Figs. 5, 6 and 9) driven by V-belts 231 that pass over a pair of pulleys 232 mounted upon an extension 233 of the idler roll 17. A generator 234 is pivotally mounted upon a rod 235 supported by vertical members 236 of the framework 221. The generator 234 has a shaft 237 which carries a pair of pulleys 238 also driven by the V-belts 231. A spring 239 yieldably urges the pulleys 238 into contact with the belts 231 to effect a drive of the generator 234 and simultaneously absorbs any slack in said belts.

The generator 234 supplies current to a storage battery 240 (Fig. 6) contained within the cabinet C. An ammeter 241 (Figs. 3 and 7) may be mounted upon a partition 242 within the cabinet C, to indicate the charging rate of the generator 234. The generator 234 and storage battery 240 provide a source of current for operating a remotely controlled motor driven pump and solenoid valves (described later) and thus renders the dynamometer apparatus self-contained and independent of electric service lines. The cabinet C also contains a sump or tank 243 provided with a drain valve 243ª, Figs. 6 and 26, a filling cap 244 and an upright vent tube 245. The tank 243 is adapted to contain water or any other suitable liquid for loading the hydraulic brake unit B. The apparatus is thus also rendered independent of water service lines. The tank 243 has a capacity of between 7 and 8 gallons, which has been found sufficient for practical purposes.

Figure 7:
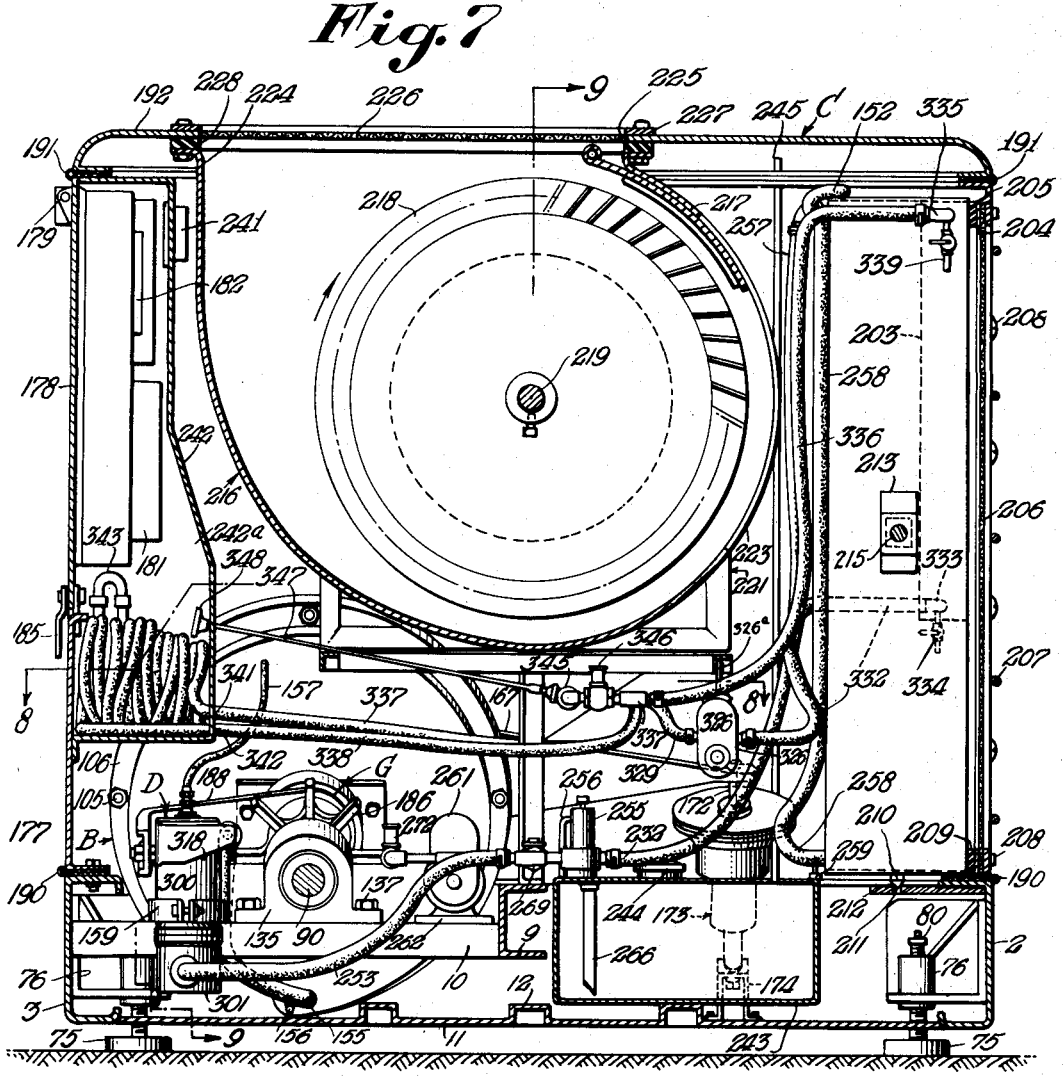
Figure 7 is a vertical sectional view taken on the line 7—7 of Figure 6.
Figure 8:
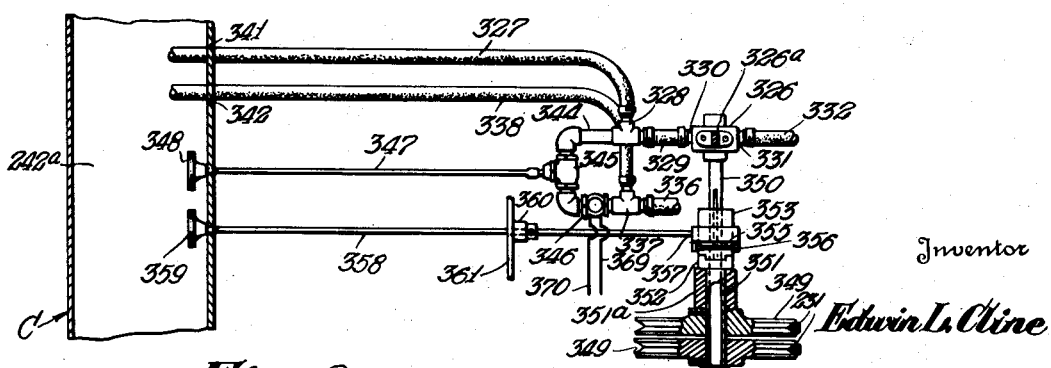
Figure 8 is a fragmentary sectional plan view taken on the line 8—8 of Figure 7 and particularly illustrating the manual control for the clutch mechanism associated with the circulating pump of the auxiliary engine cooling system.

The hose section 152, which is connected at one end with the brake unit 100 and admits liquid into said unit, has its intermediate portion 250 (Fig. 6), fastened to the shell 201 by suitable straps 251 and its opposite end connected with a discharge outlet 252 at the upper end of the heat exchanger 202. The hose section 155 connects the brake unit B with the deaerator D, as previously explained, and a hose section 253 connects said deaerator with one side of a pipe-T 254. The other side of the pipe-T 254 is connected with a relief valve 255 provided with a vent tube 256 for returning liquid to the tank 243 in the event of excessive pressure. Another hose section 257 connects the relief valve 255 with the upper end of a vertical inlet conduit 258, the lower extremity of which is connected with the lower end of the heat exchanger 202, as is best shown in Figure 7. A pet cock 259 (Figure 9) is associated with the conduit 258 and provides a means for draining the heat exchanger 202. A similar pet cock 260 is associated with the outlet 252 of the heat exchanger 202 and provides means for bleeding air out of said heat exchanger when the system is initially filled.

The hose sections 152 and 155 and 253 and 257 are associated with a loading and unloading pipe system for the hydraulic brake unit B including a pump 261 (Figs. 6 and 26) and a drive for said pump in the form of a starting motor 262 adapted to be driven by current from the storage battery 240. The inlet side 263 of the pump 261 is connected with a pipe-T 264 which in turn is connected by a section of hose 265 to a pipe 266 which extends downwardly into the tank 243 to a point adjacent the bottom thereof. The outlet side 267 of the pump 261 is connected with the stem of the T 254 by a pipe line 268 including a one-way check valve 269 arranged to allow flow only in a direction away from the pump 261. A bypass line 270 connects the pipe line 268, at a point on the discharge side of the check valve 269, with the pipe-T 264. The pipe line 270 contains a strainer 271 and a solenoid-operated valve 272.

The starting motor 262 and the solenoid-operated valve 272 are controlled by a remote control device 273 (Fig. 26) adapted to be conveniently held in the hand of the operator. The remote control device 273 is connected in circuit with the battery 240, the motor 262 and the solenoid valve 272, in the manner diagrammatically indicated. The remote control 273 includes an "On" button 274 and an "Off" button 275. A conductor 276 connects a contact 277 of the remote control device 273 with the storage battery 240. A line 278 connects the "On" button 274 with the motor 262, a relay 279 being connected in said line. A line 280 connects the "Off" button 275 with the coil of the solenoid valve 272. The battery 240, motor 262, and solenoid valve 272 are conveniently grounded, as indicated. The remote control 273 thus in reality includes two switches of which the buttons 274 and 275 are a part.

The control device 273 is arranged so that when the "On" button 274 is depressed, a circuit is completed from the battery 240 to the motor 262 which starts to drive the pump 261 to withdraw liquid from the tank 243 and introduces it into the hose section 257 connected with the inlet of the heat exchanger 252, the direction of flow in the system being indicated by full-line arrows in Figure 26. This increases the volume of liquid in the circulating system and correspondingly increases the volume of liquid in the brake unit B, whereby to increase its load absorption capacity. On the other hand, when the "Off" button 275 is depressed, a circuit is completed from the battery 240 to the solenoid valve 272 which effects opening of said valve and permits bypassing of liquid from the hose section 253 back to the tank 243, as indicated by the dotted arrows.

The effect of this is to reduce the volume of liquid in the circulating system between the brake unit B and the heat exchanger 202, and the result is that liquid is not displaced from the heat exchanger 202 back into the brake unit B; hence, the absorption capacity thereof is reduced.

Manifestly, the aforedescribed structure constitutes a means for circulating and cooling the liquid of the brake unit B as well as a means for loading and unloading said brake unit.

The deaerating device D, which is interposed between the brake unit B and the heat exchanger 202, is shown in detail in Figs. 20 to 25 and comprises a housing consisting of an upper cylindrical section 300 and a cup-like lower section 301. A cap 302 forms a closure for the upper end of the upper section 300. The lower section 301 has an upwardly projecting flange 303 (Fig. 21) on the rim thereof which is received in a mating recess 304 in the lower end of the section 300, whereby the flange and recess cooperate to maintain the sections 300 and 301 in vertical alignment.

The lower section 301 has a solid axial core 305 which is provided at its upper end with a threaded aperture 306. A plurality of radial vanes 307 extend outwardly from the core 305 and merge with the inner periphery of the section 301. The vanes 307 terminate short of the bottom of the cup section 301 as indicated at 308. The vanes 307 also terminate short of the flange 303 and a circular baffle plate 309, smaller in diameter than the internal diameter of the section 301, rests flush upon the upper edges of said vanes. A wall portion 310 of the section 301 is thickened and extends radially inwardly a sufficient distance to partially underlie the baffle 309, as is best shown in Figure 24. The thickened wall portion 310 is provided with an outlet opening 311 into which a pipe nipple 312 is threaded. The hose section 253 has one end thereof connected with the nipple 312 and its opposite end is connected witht pipe-T 254, as previously explained.

The deaerator sections 300 and 301 and the cap 302 are maintained in assembled relation by a rod 315, the lower end of which extends through the baffle 309 and is threaded into the recess 306 in the core 305, as shown in Fig. 21. The upper end of the rod 315 extends through the cover 302 and a nut 316 is threaded thereon and tightly clamps the parts together. A gasket 317 under the nut 316 prevents leakage along the rod 315.

The upper section 300 is provided with an inlet duct 318 formed exteriorly thereof. The inlet duct 318 has a threaded circular opening 319 into which a pipe nipple 320 is threaded. The hose section 155, leading from the outlet opening 153 of the brake unit B, is suitably connected with the nipple 320. Except for the circular opening 319, the inlet duct 318 is substantially rectangular in cross section and progressively decreases in width and increases in height in a direction away from the inlet opening 319. The progressive change in the width and height of the duct 318 is such that the cross sectional area throughout the length of the duct remains substantially the same. The duct 318 follows the general curvature of the cylindrical section 300 and merges into the interior of said section on a tangent with the interior surface of said section, as is best shown in Fig. 23. Hence, the liquid which passes through the duct 318 is introducted into the section 300 with a rapid rotating or whirling motion. The effect of this is to cause the liquid to tend to move radially outwardly by centrifugal force, thereby effecting a separation of the air from the liquid, in a manner readily understood. The rapid whirling motion imparted to the liquid produces a vortex, generally indicated by the dot-and-dash lines 321 (Fig. 21), and the separated air collects within this vortex. A washer 322 is welded or otherwise secured to the rod 315 adjacent the cover plate 302. The upper end of the rod 315 is provided with a longitudinal passageway 323, which communicates with the interior of the section 301 through a plurality of vent openings 324 disposed between the washer 322 and the inner face of the cover 302. The passageway 323 and the vent openings 324 provide a means of escape for the air separated from the liquid in the deaerator D. The washer 322 prevents the liquid from being splashed up into the vent openings 324 so that the amount of liquid withdrawn from the deaerator D with the air is maintained at a minimum.

A conventional coupling fitting 325 is threaded into the upper end of the passageway 323 and the air tube 157, previously referred to, is connected to said fitting. The opposite end of the tube 157 is connected with the dynamometer housing section 102 at the point 158 (see Fig. 18) on the leeward side of one of the tangential vanes 120, as previously pointed out.

The periphery of the baffle plate 309 (see Fig. 24) is spaced from the inner wall of the section 301 to provide three arcuate passageways 314 which permit liquid to pass from the section 300 downwardly into the section 301 between the vanes 307. However, in view of the fact that the baffle 309 overlaps the wall portion 310, it is impossible for the liquid to pass from the section 301 directly downwardly and out through the opening 311. Instead, the liquid must pass downwardly through the recesses 314 and along the vanes 307, which have a "straightening" effect on the swirling liquid, and then pass beneath the lower edges 308 of said vanes and then into the space adjacent the thickened wall 310 communicating with the outlet opening 311.

The depth of the air vortex 321 in the deaerator D is controlled so that its apex does not extend deeply enough to allow some of the air to pass out of said deaerator with the liquid going to the heat exchanger 202. Thus, the depth of the air vortex 321 may be controlled by making the air tube 157 of a given predetermined internal diameter so that the air will be withdrawn at a desired rate. As an alternative means of controlling the depth of air vortex 321, the vent openings 324 in the rod 315 may be made such that their combined cross sectional areas will permit withdrawal of air at such rate as to give the desired depth to the vortex. Unless this depth is controlled, air will pass into the heat exchanger 202 or too much liquid will be taken over through the tube 157 with the air and reintroduced into the brake unit B. The return of such entrained excess liquid, obviously, is undesirable because it would interfere with the maintenance of a constant load.

The radial vanes 307 in the lower section 301 of the deaerator D, in cooperation with the baffle 309, also serve to prevent the air vortex 321 from being drawn downwardly by the velocity of the liquid to such extent as to permit air to pass to the heat exchanger 202. Thus, it will be apparent that the baffle 309 permits downflow only at the peripheral spaces 314 and the "straightening" action of the vanes 307 compels the swirling liquid to move downwardly, instead of circumferentially, and thereby assists in maintaining an air vortex of the desired depth.

It will be understood that the liquid passes through the deaerator D at a considerable velocity due to the forceful pumping action provided by the rotor 124 of the hydraulic brake unit B. This velocity is sufficient to cause the liquid in the lower section 301 of the deaerator D to be forced through the hose 253 into the heat exchanger 202 and then returned through the hose 152 to the inlet opening 150 of the brake unit B. At the same time, the action of the rotor 124 tends to create a vacuum in the air tube 157, which serves the useful purpose of withdrawing the air from within the vortex 321 in the deaerator D and returning it to the housing 100 of the brake unit B.

The use of the deaerator D provides several very important operational advantages:

First, it enables the air in the dynamometer circuit to be collected at a given place, instead of being indiscriminately distributed through the heat exchanger and collected in slugs, etc. at various points in the heat exchanger or in the system. Thus, the deaerator D makes it possible to maintain a substantially solid body of water from the outlet 311 of the deaerator D to and through the heat exchanger 202 and back to the inlet opening 150 of the brake unit B. By maintaining such solid body, it is possible to maintain a more uniform loading of the brake unit B because then the rate of return of liquid to the brake housing 100 is the same as the rate of discharge of liquid from the snail or outlet 153 of the brake housing 100. In other words, the liquid from the brake unit B and the deaerator D entering the heat exchanger 202 displaces a corresponding volume of liquid which is returned to said brake unit, so that for a given loading of the hydraulic brake unit B, there is a practically constant volume of liquid circulating through the brake unit B and the heat exchanger 202, and there are no bodies or slugs of air which would be unloaded into the brake housing 100 in lieu of a similar volume of water, as would occur if the deaerator D was not used. Obviously, any variation in the constancy of the liquid volume in the brake housing 100 will affect the absorption capacity of the dynamometer and correspondingly affect the accuracy of the results obtained with the use of the dynamometer.

Secondly, the bleeding back of the air from the deaerator D to the brake housing 100 provides the advantage that the tendency for a vacuum to form in said brake housing is eliminated. This necessitates the reaching of a higher temperature of the water or other liquid in the brake unit B before any of said water or liquid can be evaporated. Thus, if a partial vacuum was formed, say a two or three inch vacuum, the liquid in the brake housing 100 would tend to evaporate at a lower temperature than in the absence of a partial vacuum, and any evaporation at all would be undesirable.

Thirdly, the return of the air to the brake housing 100 also assures a more constant volume of liquid circulating through the system, because any moisture entrained in the air is returned to the circuit, instead of being lost as would be the case if the deaerator D discharged to the atmosphere.

Fourthly, another important advantage, although incidental, is that the removal of substantially all of the air from the brake liquid results in more efficient operation of the heat exchanger 202.

Figs. 6, 7, 8 and 27 best illustrate the auxiliary cooling system employed for cooling the radiator liquid of the vehicle undergoing test. The vehicle radiator R is conventional and includes a tank portion R' above a core $R^2$ (Fig. 27). The radiator liquid is cooled by pumping the same out of the vehicle radiator R, circulating said liquid through the heat exchanger 203 and then returning it to said vehicle radiator. To this end, a circulating pump 326 is provided for withdrawing liquid from the upper tank portion R' of the vehicle radiator R. The pump 326 may be conveniently secured to the frame 221 by a bracket 326ª. A withdrawal hose section 327 is adapted to have one end thereof inserted into the tank portion R', its other end normally being connected with the stem of a pipe-T 328. A section of hose 329 connects the T 328 with the inlet side 330 of the pump 326 and the outlet side 331 of said pump is connected by a hose section 332 with the inlet 333 of the heat exchanger 203. A drain cock 334 is associated with the inlet 333 to effect draining of the heat exchanger 203, when desired. The outlet 335 of the heat exchanger 203 is connected by a hose section 336 to a pipe-T 337. A return hose 338 has one end thereof connected with the stem of the T 337 and its other end is adapted to be inserted into tank R' to effect the return of the cooled liquid to the vehicle radiator. A vent cock 339 is provided at the outlet 335 of the heat exchanger 203 for bleeding the air out of said heat exchanger.

The withdrawal hose 327 and the return hose 338 extend into the compartment 242ᵃ (Figs. 7 and 8) through openings 341 and 342, respectively. The compartment 242ᵃ serves as a storage space for said hoses when they are not in use. If desired, the free ends of the hose sections 327 and 338 may be temporarily connected by a U-shaped tube 343 (Figure 7) to keep dirt or other foreign matter from getting into said hose sections when they are handled upon the ground, and to prevent any liquid from dripping out of said hose sections into the compartment 242ᵃ when said hose sections are put away after a test.

A by-pass pipe line 344 (Fig. 27) interconnects the pipe-T's 328 and 337 and contains a manually operable valve 345 and a solenoid operated valve 346. The valve 345 has a stem extension 347 connected therewith, one end of said extension projecting through the partition wall 242 (Figs. 7 and 8) of the compartment 242ᵃ and a hand wheel 348 is mounted upon said end of said extension and is accessible from the front of the cabinet C upon raising of the instrument panel 178.

The circulating pump 326 is driven by a pair of pulleys 349 which engage the V-belts 231 with sufficient pressure to assure a drive of said pump. In testing certain types of trucks, the capacity of the radiator on the vehicle is sufficient to provide the necessary cooling for the engine undergoing test. In such case the auxiliary radiator liquid cooling system of the present apparatus need not be used. However, this is not true of a considerable number of truck radiators and is not true of conventional passenger cars, so that it is quite important to provide some auxiliary cooling means in order to maintain an engine temperature comparable to that encountered under road driving conditions when testing such vehicles. Hence, it is unnecessary to drive the pump 326 at all times. Accordingly, suitable means is provided for disengaging the drive of the pump 326 at will. Thus, the pump shaft 350 (Fig. 8) carries a sleeve 351 drivingly connected with the pulleys 349 and rotatably supported in a bracket 351ᵃ (Fig. 5) preferably adjustably mounted on the framework 221. A clutch element 352 is formed integral with the sleeve 351 and is adapted to engage with a coacting clutch element 353 slidably keyed to the pump shaft 350. The clutch elements 352 and 353 are preferably remotely controlled. To accomplish this, the clutch element 353 is provided with a groove 355 which is engaged by pins 356 carried by a yoke 357. The yoke 357 is mounted upon a rod 358, one end of which extends into the compartment 242ᵃ at a point adjacent to the valve stem extension 347. A hand wheel 359 is mounted upon said end of said rod and is also readily accessible when the instrument panel 178 is raised. The rod 358 is supported in a guide 360 (Fig. 5) carried by a brace 361 secured to the framework 221. It will be apparent that upon turning of the hand wheel 359 counterclockwise to shift the clutch element 353 into engagement with the clutch element 352, a drive of the circulating pump 326 will be effected.

Normally, the manually operated valve 345 and the solenoid valve 346 are maintained closed so that the radiator liquid cooled by the heat exchanger 203 does not flow through the by-pass line 344, but through the withdrawal hose section 327, hose 329, pump 326, hose 332, the heat exchanger 203, hose 336, and the return hose section 338. The rate of withdrawal of the radiator liquid is then determined by the capacity of the pump 326, which is such as to provide for ample cooling. However, when a closer control of the temperature of the engine undergoing test is desired, automatic, thermally responsive means is employed to permit a portion of the radiator liquid to be by-passed through the pipe 344, as required, instead of being returned to the vehicle radiator R. Such automatic control is effected through the solenoid operated valve 346, which is controlled by a thermally responsive device T (Fig. 27) adapted to be positioned upon the head or block H of the engine undergoing test. The thermally responsive device T is fully illustrated, described and claimed in my copending application Serial No. 443,834, filed May 20, 1942, Patent 2,417,860, and entitled "Thermostat," and hence need not be described fully herein. This device is also illustrated and adequately described in my copending application Serial No. 443,833, supra. However, it is pointed out that the thermostat device T includes a permanent magnet (not shown) which retains the same on any portion of the engine desired. The thermostat device T also includes a fixed contact 366 and a movable contact 367 carried by a thermally responsive element 368, which is adapted to move the contact 367 into engagement with the contact 366 when the temperature of the engine liquid reaches about 165° F. The contact 366 is connected by a conductor 369 to one side of the coil of the solenoid valve 346 and the other side of said coil is connected by a conductor 370 with the battery 240. A conductor 371 connects the battery 240 with the thermally responsive element 368. Hence, when the contacts 366 and 367 are engaged the solenoid valve 346 will be actuated to its open position. The manually operated valve 345 should, of course, be open when the thermostat device T is to be used, so that by-passing through the pipe line 344 occurs whenever the solenoid valve 346 is opened in response to the cooling requirements of the engine undergoing test. It will be noted in this connection that current is supplied to the solenoid valve 346 only at such time as the valve 346 is to be opened. This results in the use of a minimum of battery current.

Referring now to Figure 3, the partition 242 is provided with three electrical sockets 375, 376 and 377. The socket 375 is adapted to have an extension cord 378 connected therewith containing the conductors 369 and 370 associated with the thermostat device T. The socket 376 has one end of an extension cord 379 connected therewith and its opposite end is adapted to be connected to a plug 380 on the instrument panel 178. The purpose of the extension cord 379 is to connect the speed and power instruments 180 and 181 with the generator G' and the torque measuring device 173. The extension cord 379 is of substantial length so that the instrument panel 179 may be removed as a whole from the cabinet C, if desired, and mounted upon a work bench or other convenient support within easy view of the operator. The socket 377 is adapted to receive one end of an extension cord 381 containing the wires 276, 278 and 280 associated with the remote control device 273 for loading and unloading the brake unit B. The extension cords 378, 379 and 381 can be conveniently stored in the hose compartment 242ᵃ when not in use.

Figure 13:
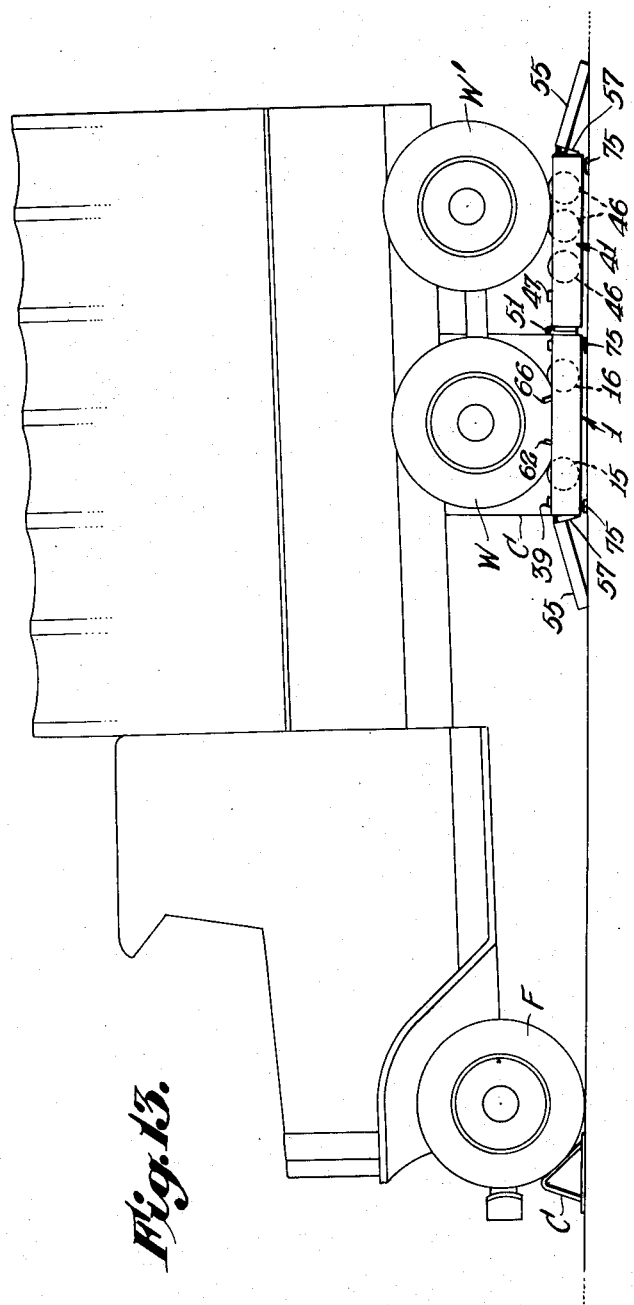
Figure 13 is a diagrammatic view illustrating the manner in which the present chassis dynamometer may be used to test a six wheel truck.

The manner of use and operation of the chassis dynamometer described herein is as follows:

When the dynamometer apparatus is to be used in an open field, a fairly level spot should be selected, or if none is available all depressions should be filled to make the earth upon which it is to rest substantially level. The plates 11, 13, and 14 at the underside of the main frame 1 and the plates 48 at the underside of the bogie frames 40 and 41 are adapted to contact the earth, and the area thereof is sufficient to support even a fully loaded truck with a unit load pressure less than that on the tires themselves. Hence, there is no tendency for the frame 1 or the bogie frames 40 and 41 to "bury" themselves in use. When the apparatus is used upon a hard surface, or upon a concrete floor, the frame 1 is first leveled up by adjusting the feet 75 on said main frame 1 and on the bogie frames 40 and 41, as previously described. Once the dynamometer apparatus has been set up for use, either on the ground or on a cement floor, the general procedure in preparing a motor vehicle for test to determine faulty and/or malfunctioning parts of the engine and/or vehicle is to either back the vehicle onto or drive the same forwardly onto the main frame 1 so that one pair of rear drive wheels W (Figs. 12 and 13) is cradled between the rolls 15—16 and 17—18. When a six-wheel vehicle is to be tested, the rearmost pair of wheels W' is engaged with the rolls 46 of the bogie frames 40 and 41. The tires on the wheels W and W' are inflated to the proper pressure and the pawls 62 and 66 are checked to see that they are disengaged from the ratchets 60 and 61 (Fig. 12). Chocks C are placed in contact with the front wheels F as a precautionary measure to prevent the vehicle from inadvertently leaving the dynamometer rolls, but with the present design the chocks C are wholly unnecessary, inasmuch as there is no tendency whatever for the rear wheels to ride up on said rolls during a test regardless of the speed at which they are driven.

The panel 178 is then raised to the position shown in Fig. 4 to expose the dynamometer instruments. Raising of the panel 178 provides access to the compartment 248ᵃ containing the hose sections 327 and 338, and the extension cords 379, 381 and 378 for the instruments 180 and 181, and the remote control devices T and 273, respectively.

The extension cord 378 of the thermostat control device T (if automatic temperature control is desired) is then connected with the socket 375 and said device is positioned on the desired portion of the engine, preferably the head H (Fig. 27), said device being held in place by a built-in permanent magnet (not shown). The extension cords 379 and 381 are also preferably connected with their respective sockets 376 and 377 at this time.

Figure 27 diagrammatically illustrates the auxiliary, "closed" cooling system which is adapted to be associated with the radiator R of the vehicle undergoing test in order to cool the liquid which is normally circulated through its engine. This system is illustrated, described and claimed in application Serial No. 775,766, filed September 24, 1947, now Patent 2,476,837, which is a division of Serial No. 443,833 filed May 20, 1942, now Patent 2,452,550. It will be noted from a comparison of the size of the heat exchanger 203 for cooling the radiator liquid, with the heat exchanger 202 for cooling the brake liquid, that the capacity of the former is by far the smaller. In any event, the capacity of the auxiliary heat exchanger 203 is such that no substantial or detrimental volume of water will be withdrawn from the circulating system of the engine being tested.

The radiator cap is next removed and the free ends of the withdrawal and return hose sections 327 and 338 are inserted through the neck of the radiator R into the tank R'. In certain vehicles, especially large trucks, the cooling capacity of the radiator is such that it is unnecessary to employ the auxiliary radiator liquid cooling system shown herein. However, for most passenger vehicles, such auxiliary cooling is essential in order to properly control the temperature of the engine undergoing test.

Upon placing the vehicle transmission in gear, the idler roll 17 will be driven by a wheel W. Actuation of the clutch 352—353 through the hand wheel 359 will then effect a drive of the circulating pump 326 through the V-belts 231. The blower 216, of course, is driven by said belts immediately upon driving of the idler roll 17, so that the liquid from the radiator R will be pumped out of the tank portion R' through the withdrawal hose 327, passed through the heat exchanger 203 to be cooled and then returned to said radiator through the return hose 338. Simultaneously, the generator 234 will be driven to charge the battery 240.

It will be understood that when the thermostat device T is employed to automatically control the temperature of the liquid in the radiator R, the valve 345 will have been manually opened so that the by-passing of liquid from the heat exchanger 203 can occur through the by-pass line 344; the solenoid valve 346 automatically opening and closing under the control of the thermostat T to maintain the engine undergoing test at the desired temperature.

Simultaneously with the driving of the idler roll 17, the drive rolls 16 and 18 are rotated, and their motion is transmitted through the shaft 90 to the rotor 124 in the brake unit B.

Figure 26 diagrammatically illustrates the circuit of the closed cooling system employed with the brake unit B. In the normal operation of the chassis dynamometer, the brake unit B is loaded with liquid to the extent desired by actuating the "On" button 274 of the remote control device 273. This completes the circuit to the motor 262 which drives the pump 261 so that liquid is withdrawn from the sump tank 243, forced past the check valve 269 and introduced into the heat exchanger 202, causing a corresponding volume of liquid to be displaced from said heat exchanger and introduced into the housing 100 of the brake unit B through the hose 152; the solenoid operated valve 272, of course, being closed at this time. When the desired loading has been attained, as indicated by the speed in miles per hour on the meter 180, or the car speedometer, the "On" button is released and the circuit to the motor 262 driving the pump 261 is interrupted. A continuous circulation of the liquid through the brake unit B, deaerator D and heat exchanger 202 is then maintained by virtue of the pumping action of the rotor 124. When it is desired to unload or reduce the load absorption capacity of the brake unit B, the "Off" button 275 of the control device 273 is actuated, thereby completing a circuit to the solenoid valve 272, which opens and permits liquid discharged through the hose 253 to be returned through the strainer 271 and solenoid valve 272 to the sump tank 243. In this manner, the absorption capacity of the brake unit may be varied to simulate as many load conditions for comparative test purposes as desired. Simulation of acceleration or hill climbing conditions may be achieved by gradually introducing additional liquid into the brake housing 100, as will be readily understood. Similarly, "drag down" tests can be performed by rapidly filling the brake housing 100 and thus constantly increasing the load on the engine. The effect of the drag down and the reaction of the engine to rapid load can be observed from the speed and power meters 180 and 181.

The deaerator D functions, of course, to remove the air in the brake liquid going to the brake unit B, in the manner already described, thereby providing the several operational advantages set forth herein.

The vacuum developed by the engine at various speeds can also be determined by connecting the vacuum gauge 182 with the engine intake manifold in the customary manner.

Likewise, the exhaust gas analyzer 183 may be connected with the engine muffler in a conventional manner. Any necessary tubing or hose connections can be stored in the compartment 242ᵃ along with the extension cords for the remote control device 273, etc., when not in use.

Any prescribed or desired routine may be employed in conducting the test, and any necessary adjustments may be made or parts replaced as the test proceeds. However, after the test has been completed, the brake unit B is preferably unloaded by actuating the "Off" button 275 of the remote control device 273. The withdrawal hose 327 is then removed from the radiator R and the pump 326 is permitted to operate until all of the liquid withdrawn from said radiator has been returned thereto through the return hose 338, whereby none of the original radiator liquid is lost or discarded. Thereafter, the return hose section 338 is also withdrawn from the radiator R. The U-shaped member 343 may then be inserted into the ends of the hose sections 327 and 338 to prevent any dirt from entering the same. Either the pawl 62 or both of the pawls 66 may be engaged with their cooperative ratchets 60 and 61 so that the vehicle can then be removed from the testing apparatus.

Figure 28 diagrammatically illustrates a modified form of the invention in which the motor driven pump 261 for effecting loading of the hydraulic brake unit has been eliminated, and a gravity feed system substituted in lieu thereof. Thus, in order to supply loading liquid to a hydraulic brake $B^3$ by gravity, a storage tank $243^c$ is maintained at an elevation higher than said brake unit and conduit $265^c$ is connected at one end with the bottom of said tank and communicates at its opposite end with the inlet $150^c$ of said brake unit. A loading valve V is connected in the conduit $265^c$ and controls the flow of liquid from the tank $243^c$ to the brake unit $B^3$ and thereby governs all increases in load absorption capacity of said brake unit. A deaerator $D^3$ and a heat exchanger $202^c$ are associated with the brake unit $B^3$ in the manner previously described in connection with Figure 26, except that the outlet conduit $152^c$ of the heat exchanger is conveniently connected at its discharge end with the stem of a pipe T 390 connected in the conduit $265^c$ at a point adjacent to the inlet $150^c$ of the brake unit $B^3$, and a second pipe T 391 is conveniently interposed in the conduit $155^c$ adjacent the outlet $153^c$ of said brake unit, the stem of the pipe T 391 being connected by a conduit 392 with the storage tank $243^c$. An unloading valve V' is connected in the conduit 392 and serves to control unloading of the brake unit $B^3$ to reduce its load absorption capacity, the rotor of the brake unit serving to force the liquid through the conduit 392 back into the tank $243^c$, whenever the valve V' is open. It will be obvious that the valves V and V' may be actuated by a remote control device similar to the device 273 shown in Figure 26 to effect the desired loading and unloading of the brake unit $B^3$. However, it is to be understood that the valves V and V' may be of a manually operated type if the electrical remote control is not desired or feasible for a particular dynamometer unit.

It will be noted that Figure 28 illustrates a gravity feed system for the brake unit $B^3$ associated with a closed circulating system for the brake liquid so that, assuming the brake unit $B^3$ has been loaded to the extent desired, circulation of the brake liquid occurs from the brake unit $B^3$ through the pipe T 391, conduit $155^c$, the deaerator $D^3$, conduit $253^c$, the heat exchanger $202^c$ and then back to the brake unit $B^3$ through the conduit $152^c$ and pipe T 390. A tube $157^c$ reurns air from the deaerator $D^3$ to the brake unit $B^3$ and a tube $245^c$ serves as a vent for the tank $243^c$. The liquid passing through the heat exchanger $202^c$ may be cooled by a suction blower, as previously described, or by a propeller type fan or any other suitable means (not shown).

The load absorption capacity of the hydraulic brake unit $B^3$ can be increased by opening the loading valve V for the necessary time interval to increase the volume of liquid circulating in the closed system by gravity. On the other hand, if it is desired to reduce the load absorption capacity of the hydraulic brake unit $B^3$ the unloading valve V' is opened to bleed the necessary amount of liquid from the closed circulating system back into the tank $243^c$. Thus, the hydraulic brake unit $B^3$ is loaded by gravity and is made to unload itself by the pumping action of the rotor forcing liquid back into the tank $243^c$ through the conduit 392. The advantages of this form of the invention manifestly lie in its relative simplicity.

Figure 29 diagrammatically illustrates a hydraulic brake unit $B^4$ of unusually high power absorption capacity, say about 8000 horsepower. In units of such size it is not deemed feasible to employ a heat exchanger because the cost of said heat exchange would exceed that of the brake unit. The elimination of the heat exchanger necessarily requires the use of an open system in which liquid is continuously passed through the brake unit and then discharged to waste. However, the difficulty with such systems heretofore has been that a constant or given load absorption capacity could not be maintained in the brake unit because of variations in the rate of inflow and outflow. However, by employing the present deaerator and using flow regulating and indicating means in both the inlet and outlet conduits associated with the brake unit, it is possible to accurately maintain any desired load absorption capacity and to increase or decrease the load absorption capacity as desired. Thus, a liquid supply conduit 400 is connected with the inlet $150^d$ of a hydraulic brake unit $B^4$ and any suitable or conventional flow regulating and metering device 401 is connected in said conduit. The device 401 includes a valve hand wheel 402 for regulating the rate of flow of liquid to the brake unit $B^4$ and indicating means 403 for indicating said rate. The outlet $153^d$ of the brake unit $B^4$ is connected by a conduit $155^d$ to a deaerator $D^4$, which functions in the manner already described. The outlet of the deaerator $D^4$ is connected with a conduit 404 which discharges to waste. A flow regulating and indicating device 405 similar to the device 401 is connected in the discharge conduit 404. A valve wheel 406 controls the rate of discharge and an indicator 407 indicates said rate of discharge.

It will be noted that the deaerator $D^4$ is interposed between the hydraulic brake unit $B^4$ and the flow regulating and indicating device 405. Hence, only deaerated brake liquid will be discharged through the conduit 404 and the air separated from said liquid will be returned to the brake unit $B^4$ through a tube $157^d$. Accordingly, in order to maintain a constant load absorption capacity, it is only necessary to adjust the valve handles 402 and 406 so that the flow rate indicating means 403 and 407 have an identical reading.

If it is desired to increase the load absorption capacity of the brake unit $B^4$, the valve handle 402 is rotated to permit liquid to flow into the unit $B^4$ at a faster rate, and when the desired loading is reached, the valve handle 402 is readjusted to reduce the flow so that the reading of the inlet-rate indicator 403 corresponds with that of the discharge-rate indicator 407. The volume of fluid then introduced into the brake unit $B^4$ will be the same as that discharged and the load absorption capacity will be maintained constant at the increased value. Similarly, if it is desired to reduce the load absorption capacity of the brake unit $B^4$ the valve handle 406 is rotated to permit liquid to drain from the brake unit $B^4$ at a faster rate than it is being introduced. When the load has been reduced to the extent desired the valve handle 406 is then readjusted so that the reading of the discharge-rate indicator 407 corresponds to that of the inlet-rate indicator 403, whereupon a constant rate of inflow and outflow is reestablished and a constant reduced load absorption capacity is maintained.

The importance of the deaerator $D^4$ in maintaining a constant load in the hydraulic brake unit $B^4$ will be apparent when the fact is considered that the housing of said brake unit must be vented to the atmosphere through an air check valve $156^d$, or some equivalent means, to prevent the formation of a vacuum condition in said brake unit. The admission of air necessarily results in entrainment or mixing thereof in the liquid in the brake unit so that the liquid expelled from said brake unit contains tiny air bubbles. If the liquid containing the air bubbles was permitted to flow through the device 405, the maintenance of a constant load could not be achieved because the metering device would then measure the volume or rate of flow of both the air and the liquid, and although the indicating devices 403 and 407 showed an equal volume of flow, the brake unit $B^4$ would gradually load up to the extent of the volume of the air entrained in the liquid discharged therefrom with the result that the load absorption capacity of the brake unit $B^4$ would gradually increase instead of remaining constant. However, by removing the air from the liquid before it passes through the regulating and metering device 405, only a solid stream of liquid passes through said device and it is thus possible to adjust the discharge rate of this solid stream to correspond identically with the solid stream being introduced into the brake unit B⁴ through the conduit 400. Constancy of load can then be readily maintained.

While the closed circulating system for cooling the brake liquid and the closed circulating system for cooling the radiator liquid have been shown associated with a portable chassis dynamometer, it is to be understood that the same may be advantageously used for other types of dynamometers, for example, engine dynamometers where the brake shaft and engine shaft are directly connected; or in installations where the hydraulic brake unit serves as a brake instead of a hydraulic power absorption device; for example, when the brake unit B is associated with the propeller shaft of a vehicle.

It will also be understood that the deaerator disclosed herein is generally useful, and is not limited to use with either a portable chassis dynamometer or an engine dynamometer but is capable of use with other dynamometer constructions (not necessarily including a heat exchanger and a closed circulating system) for removing the air from the liquid either before or after said liquid is introduced into the brake unit.

It will further be understood that various changes may be made in the construction and arrangement of the parts of the chassis dynamometer shown herein without departing from the spirit of the invention or the scope of the annexed claims.

I claim:

1. In a method of operating a dynamometer having a hydraulic brake unit for absorbing the power developed by an engine, the steps of: continuously removing brake liquid from said hydraulic brake unit, separating the air from said removed liquid to deaerate said liquid and returning said air to said hydraulic brake unit; cooling said deaerated liquid; and returning said cooled, deaerated liquid to said hydraulic brake unit.

2. A device for absorbing the energy of a driven member, comprising: a hydraulic brake unit including a housing adapted to contain a liquid and a rotor in said housing adapted to be connected with said driven member, said housing having an inlet opening and an outlet opening; a deaerating device having an inlet opening and an outlet opening; a conduit connecting the outlet of said brake housing with the inlet of said deaerating device; a heat exchanger having an inlet and an outlet; a conduit connecting the outlet of said deaerator with the inlet of said heat exchanger; a conduit connecting the outlet of said heat exchanger with the inlet of said brake housing, said deaerating device also having an outlet for the air separated from said brake liquid; and a conduit connecting said air outlet with said brake housing for returning the separated air to said brake housing.

3. Apparatus for absorbing the energy of a rotating element comprising: a hydraulic brake unit including a stator adapted to contain a liquid, and a rotor in said stator adapted to be connected with said rotating element; a heat exchanger; and means including a deaerating device interconnecting said hydraulic brake unit and heat exchanger to provide a continuous circuit forming a closed circulating system arranged so that the liquid forced out of said stator by the action of said rotor is continuously deaerated and circulated through said heat exchanger to be cooled and then returned to said stator, said interconnecting means including a selectively operable motor-driven pump and an unloading valve for adding liquid to the system at will and for draining liquid from said system at will, respectively, whereby to vary the load absorption capacity of said hydraulic brake unit as desired.

4. A device for absorbing the energy of a driven member comprising: a hydraulic brake unit including a housing adapted to contain a liquid, and a rotor in said housing adapted to be connected with said driven member; means for controlling and varying the volume of liquid in said brake unit at will including an electrically operated pump for introducing liquid into said brake and an electrically operated unloading valve for draining liquid from said brake unit; and a remote control including two switches, one for effecting operation of said pump and one for effecting opening of said valve.

5. Apparatus for absorbing the energy of a rotating element comprising: a hydraulic brake unit including a stator adapted to contain a liquid, and a rotor in said stator adapted to be connected with said rotating element; a heat exchanger; conduit means interconnecting said hydraulic brake unit and said heat exchanger and a deaerating device connected in said conduit means to provide a continuous circuit forming a closed circulating system for both cooling and deaerating the brake liquid; a storage tank for brake liquid; means including a pump for withdrawing liquid from said storage tank and introducing it into said circulating system at will; and means for bleeding liquid from said circulating system at will and returning it to said storage tank, whereby to vary the load absorption capacity of said hydraulic brake unit as desired.

6. Apparatus for absorbing the energy of a rotating element comprising: a hydraulic brake unit including a stator adapted to contain a liquid, and a rotor in said stator adapted to be connected with said rotating element; a heat exchanger; means interconnecting said hydraulic brake unit and heat exchanger to provide a continuous circuit forming a closed circulating system arranged so that the liquid forced out of said stator by the action of the rotor is continuously circulated through said heat exchanger to be cooled and then returned to said stator; a storage tank for brake liquid, said interconnecting means including a pump for withdrawing liquid from said storage tank and an electric motor for driving said pump for introducing said liquid into said heat exchanger to displace an equal volume for admission into said stator, said interconnecting means also including an electromagnetic valve for effecting draining of liquid from said stator for return to said storage tank; and means including a remote control for selectively actuating said electric motor and electromagnetic valve at will to vary the volume of liquid contained in said stator and circulated through said heat exchanger, whereby to vary the load absorption capacity of said hydraulic brake unit as desired.

7. Apparatus for absorbing the energy of a rotating element comprising: a hydraulic brake unit including a stator adapted to contain a liquid, and a rotor in said stator adapted to be connected with said rotating element; a heat exchanger; means including a deaerating device interconnecting said hydraulic brake unit and heat exchanger to provide a continuous circuit forming a closed system arranged so that the liquid forced out of said stator by the action of said rotor is continuously deaerated and circulated through said heat exchanger to be cooled and then returned to said stator; a storage tank for brake liquid, said interconnecting means also including a pump for withdrawing liquid from said storage tank and a motor for driving said pump for introducing said liquid into said heat exchanger to displace an equal volume for admission into said stator, said interconnecting means further including an electromagnetic valve for effecting draining of liquid from said stator for return to said storage tank; and means including a remote control for selectively actuating said electric motor and electromagnetic valve at will to vary the volume of liquid contained in said stator and circulated through said heat exchanger, whereby to vary the load absorption capacity of said hydraulic brake unit as desired.

8. A device for absorbing the energy of a driven member, comprising: a hydraulic brake unit including a housing adapted to contain a liquid and a rotor in said housing adapted to be connected with said driven member, said housing having an inlet opening and an outlet opening; a heat exchanger; a conduit connecting the outlet of said brake housing with the inlet of said heat exchanger; a second conduit connecting the outlet of said heat exchanger with the inlet of said brake housing, whereby a closed circulating system for the brake liquid is provided; a storage tank for brake liquid, a pipe line connecting said storage tank with said first-mentioned conduit; a pump connected in said pipeline for pumping liquid from said storage tank and introducing it into said circulating system to thereby effect an increase in the volume of liquid in said hydraulic brake unit and increase the absorption capacity thereof; an electric motor for driving said pump; a one-way check valve connected in said pipe line between said pump and said second conduit arranged to allow flow only in a direction away from said pump; a by-pass line associated with said pipe line arranged to by-pass liquid around said pump and check valve; a solenoid valve connected in said by-pass line for permitting liquid to be drained from said circulating system to decrease the volume of liquid in said hydraulic brake unit and thereby reduce the absorption capacity of said hydraulic brake unit; and remote control means for selectively operating said motor and said solenoid valve to vary the load absorption capacity of said hydraulic brake unit as desired.

9. A device for absorbing the energy of a driven member, comprising: a hydraulic brake unit including a housing adapted to contain a liquid and a rotor in said housing adapted to be connected with said driven member, said housing having an inlet opening and an outlet opening; a deaerating device having an inlet opening and an outlet opening; a conduit connecting the outlet of said brake housing with the inlet of said deaerating device, said deaerating device also having an outlet for the air separated from said brake liquid; a heat exchanger having an inlet and an outlet; a second conduit connecting the outlet of said deaerator with the inlet of said heat exchanger; a third conduit connecting the outlet of said heat exchanger with the inlet of said brake housing, whereby a closed circulating system for the brake liquid is provided; a storage tank for brake liquid; a pipe line connecting said storage tank with said second conduit; a pump connected in said pipe line for pumping liquid from said storage tank and introducing it into said circulating system to thereby effect an increase in the volume of liquid in said hydraulic brake unit and increase the absorption capacity thereof; an electric motor for driving said pump; a one-way check valve connected in said pipe line between said pump and said second conduit arranged to allow flow only in a direction away from said pump; a by-pass line associated with said pipe line arranged to by-pass liquid around said pump and check valve; a solenoid valve connected in said by-pass line for permitting liquid to be drained from said circulating system to decrease the volume of liquid in said hydraulic brake unit and thereby reduce the absorption capacity of said hydraulic brake unit; and remote control means for selectively operating said motor and said solenoid valve to vary the load absorption capacity of said hydraulic brake unit as desired.

10. A device for absorbing the energy of a driven member, comprising: a hydraulic brake unit including a housing adapted to contain a liquid and a rotor in said housing adapted to be connected with said driven member, said housing having an inlet opening and an outlet opening; a deaerating device having an inlet opening and an outlet opening; a conduit connecting the outlet of said brake housing with the inlet of said deaerating device, said deaerating device also having an outlet for the air separated from said brake liquid; a tube connecting said air outlet with said brake housing for returning the separated air to said brake housing; a heat exchanger having an inlet and an outlet; a second conduit connecting the outlet of said deaerator with the inlet of said heat exchanger; a third conduit connecting the outlet of said heat exchanger with the inlet of said brake housing, whereby a closed circulating system for the brake liquid is provided; a sump for brake liquid, a pipe line connecting said sump with said second conduit; a pump connected in said pipe line for pumping liquid from said sump and introducing it into said circulating system to thereby effect an increase in the volume of liquid in said hydraulic brake unit and increase the absorption capacity thereof; an electric motor for driving said pump; a one-way check valve connected in said pipe line between said pump and said second conduit arranged to allow flow only in a direction away from said pump; a by-pass line associated with said pipe line arranged to by-pass liquid around said pump and check valve; a solenoid valve connected in said by-pass line for permitting liquid to be drained from said circulating system to decrease the volume of liquid in said hydraulic brake unit and thereby reduce the absorption capacity of said hydraulic brake unit; and remote control means for selectively operating said motor and said solenoid valve to vary the load absorption capacity of said hydraulic brake unit as desired.

11. Dynamometer apparatus comprising: an idler roll and a drive roll adapted to be engaged by the driven wheels of a vehicle; a hydraulic brake unit adapted to contain a brake liquid; means operatively connecting said brake unit with said drive roll; a heat exchanger normally filled with brake liquid when the hydraulic brake unit is in operation regardless of the volume of brake liquid in said hydraulic brake unit; conduit means interconnecting said brake unit and said heat exchanger also filled with brake liquid and arranged to provide a closed, filled circulating system for the brake liquid exteriorly of said brake unit; and means driven by one of said rolls for cooling the liquid circulating through said heat exchanger.

12. Engine testing apparatus comprising: a chassis dynamometer including an idler roll and a drive roll adapted to be engaged by the driven wheels of the vehicle undergoing test; a hydraulic brake unit connected with said drive roll for absorbing the power developed by said engine; heat exchange means for cooling the liquid of said brake unit; conduit means interconnecting said brake unit and heat exchange means arranged to provide a closed circulating system for the brake liquid; means driven by said idler roll for cooling said heat exchange means; and a deaerating device connected with said conduit means for removing the air from the liquid of said brake unit.

13. Dynamometer apparatus comprising: an idler roll and a drive roll adapted to be engaged by the driven wheels of a vehicle; a hydraulic brake unit adapted to contain a brake liquid; means operatively connecting said brake unit with said drive roll; a heat exchanger; conduit means interconnecting said brake unit and said heat exchanger arranged to provide a closed circulating system for the brake liquid; a deaerator connected in said conduit means between said brake unit and said heat exchanger; and a blower driven by one of said rolls for cooling the deaerated liquid circulating through said heat exchanger.

14. A chassis dynamometer including a frame; an idler roll and a drive roll adapted to be engaged by the driven wheels of a vehicle; bearings rotatably supporting said rolls on said frame; a cabinet mounted upon said frame and having an air inlet opening in the rear wall thereof and an air outlet opening in the top wall thereof; a hydraulic brake unit within said cabinet mounted upon said frame and including a housing, a brake shaft and a rotor in said housing secured to said brake shaft; bearing means rotatably supporting said brake shaft on said frame; means operatively connecting said brake shaft with said drive roll; a heat exchanger in said cabinet adjacent said air inlet opening; conduit means interconnecting said brake housing and heat exchanger to provide a closed circulating system for the brake liquid; and a suction blower driven by said idler roll for effecting cooling of the brake liquid circulating through said heat exchanger, said suction blower having an outlet registering with the air outlet of said cabinet.

15. A chassis dynamometer including: a frame, an idler roll and a drive roll adapted to be engaged by the driven wheels of a vehicle; bearings rotatably supporting said rolls on said frame; a cabinet mounted upon said frame and having an air inlet opening in the rear wall thereof and an air outlet opening in the top wall thereof; a hydraulic brake unit within said cabinet mounted upon said frame and including a housing, a brake shaft and a rotor in said housing secured to said brake shaft; bearing means rotatably supporting said brake shaft on said frame; means operatively connecting said brake shaft with said drive roll; a heat exchanger in said cabinet adjacent said air inlet opening; conduit means interconnecting said brake housing and heat exchanger to provide a closed circulating system for the brake liquid; a suction blower driven by said idler roll for effecting cooling of the liquid circulating through said heat exchanger, said suction blower having an outlet registering with the air outlet of said cabinet; a sump for brake liquid operatively connected with said closed circulating system; and means for controlling interflow of brake liquid between said system and sump to vary the load absorption capacity of said hydraulic brake unit.

16. A chassis dynamometer including a frame; an idler roll and a drive roll adapted to be engaged by the driven wheels of a vehicle; bearings rotatably supporting said rolls on said frame; a cabinet mounted upon said frame and having an air inlet opening in the rear wall thereof and an air outlet opening in the top wall thereof; a hydraulic brake unit within said cabinet mounted upon said frame and including a housing, a brake shaft and a rotor in said housing secured to said brake shaft; bearing means rotatably supporting said brake shaft on said frame; means operatively connecting said brake shaft with said drive roll; a heat exchanger in said cabinet adjacent said air inlet opening; a deaerator; conduit means interconnecting said brake housing, deaerator and heat exchanger to provide a closed circulating system for the brake liquid; and a suction blower driven by said idler roll for effecting cooling of the deaerated liquid circulating through said heat exchanger, said suction blower having an outlet registering with the air outlet of said cabinet.

17. A self-contained chassis dynamometer apparatus comprising: a main frame; an idler roll and a drive roll mounted in said frame adapted to be engaged by the driven wheels of a vehicle; a hydraulic brake unit connected with said drive roll for absorbing power developed by the engine of said vehicle; a heat exchanger; conduit means interconnecting said brake unit and said heat exchanger arranged to provide a closed circulating system for the brake liquid; a storage tank providing a sump for brake liquid; electrically operated means for withdrawing liquid from said sump and introducing it into said circulating system and for withdrawing liquid from said circulating system and returning it to said sump, whereby said hydraulic brake unit may be loaded or unloaded as desired; a blower for cooling the liquid circulating through said heat exchanger; means including a belt for driving said blower from said idler roll; a storage battery; and a generator driven by said belt for charging said battery to provide a source of current for operating said electrically operated brake unit loading and unloading means.

18. A self-contained chassis dynamometer apparatus comprising: a main frame; an idler roll and a drive roll mounted in said frame adapted to be engaged by the driven wheels of a vehicle; a hydraulic brake unit connected with said drive roll for absorbing power developed by the engine of said vehicle; a deaerator; a heat exchanger; conduit means interconnecting said brake unit, deaerator and said heat exchanger arranged to provide a closed circulating system for the brake liquid; a storage tank for brake liquid; electrically operated means for withdrawing liquid from said tank and introducing it into said circulating system and for withdrawing liquid from said circulating system and returning it to said storage tank, whereby said hydraulic brake unit may be loaded or unloaded as desired; a blower for cooling the liquid circulating through said heat exchanger; means including a belt for driving said blower from said idler roll; a storage battery; and a generator driven by said belt for charging said battery to provide a source of current for operating said electrically operated brake loading and unloading means.

19. A self-contained chassis dynamometer apparatus comprising: a main frame; an idler roll and a drive roll mounted in said frame adapted to be engaged by the driven wheels of a vehicle; a hydraulic brake unit connected with said drive roll for absorbing power developed by the engine of said vehicle; a heat exchanger; conduit means interconnecting said brake unit and said heat exchanger arranged to provide a closed circulating system for the brake liquid; a storage tank for excess brake liquid; electrically operated means for withdrawing liquid from said tank and introducing it into said circulating system and for withdrawing liquid from said circulating system and returning it to said storage tank, whereby said hydraulic brake unit may be loaded or unloaded as desired; a second heat exchanger disposed in confronting relation to said first-mentioned heat exchanger and providing an auxiliary cooling means for the liquid in the radiator of the engine undergoing test; withdrawal and return hose sections connected with said second heat exchanger and having free ends adapted to be inserted into said radiator; electrically operated means controlling the withdrawal and return of liquid to said radiator; a blower; said heat exchangers and blower being arranged so that said blower simultaneously cools the liquid circulating through both of said heat exchangers; means including a belt for driving said blower from said idler roll; a storage battery; and a generator driven by said belt means for charging said battery to provide a source of current for operating said electrically operated means.

20. Dynamometer apparatus comprising: an elongated main frame; a pair of rolls mounted in said frame; a bogie frame at one side of said main frame positioned in transverse alignment with said rolls; means pivotally connecting said bogie frame with said main frame for movement about an axis substantially parallel with said rolls, whereby said bogie frame can be swung over onto said main frame when the apparatus is not in use; a plurality of rolls carried by said bogie frame; and ramp means at the opposite side of said main frame and at the side of said bogie frame remote from said main frame.

21. Dynamometer apparatus comprising: a main frame; a pair of rolls mounted in said main frame; a plurality of adjustable feet carried by said main frame for levelling and supporting said main frame on a hard surface; a ramp at one side of said main frame in transverse alignment with said rolls; a bogie frame at the opposite side of said main frame aligned with said rolls; hinge means pivotally connecting said bogie frame with said opposite side of said main frame; a plurality of idler rolls carried by said bogie frame; a plurality of adjustable feet carried by said bogie frame at the free side thereof for levelling and supporting said bogie frame in alignment with said main frame; and a ramp at the free side of said bogie frame aligned with the idler rolls carried by said bogie frame.

22. Dynamometer apparatus comprising: a substantially rectangular main frame; a plurality of pairs of rolls mounted in said frame, each pair of said rolls including an idler roll and a drive roll; a pair of bogie frames pivotally connected at one side thereof to one side of said main frame for movement about an axis substantially parallel with said rolls; a plurality of rolls mounted in each of said bogie frames; a pair of brackets mounted upon each of said bogie frames on the side thereof remote from said main frame; two pairs of brackets mounted upon the opposite side of said main frame; and ramps, each having a pair of pins adapted to connect the ramp associated therewith with a pair of said brackets.

23. Dynamometer apparatus comprising: a main frame; a pair of rolls mounted in said main frame; closure plate means at the lower side of said frame serving as supporting means when said frame is resting upon soft ground; a ramp at one side of said main frame in transverse alignment with said rolls; a bogie frame at the opposite side of said main frame aligned with said rolls; hinge means pivotally connecting aid bogie frame with said opposite side of said main frame; a plurality of idler rolls carried by said bogie frame; closure plate means at the lower side of said bogie frame serving as supporting means when said bogie frame is resting upon soft ground; and a ramp at the free side of said bogie frame aligned with the idler rolls carried by said bogie frame.

24. A chassis dynamometer comprising: a main frame; a plurality of pairs of rolls mounted in said frame, each pair of said rolls including a drive roll and an idler roll; means interconnecting said drive rolls; a hydraulic brake unit including a shaft; means drivingly connecting said shaft with said interconnected rolls; a pair of bogie frames at one side of said main frame; means hingedly connecting said bogie frames to said main frame for movement about an axis substantially parallel with said rolls; a plurality of rolls carried by each of said bogie frames; and ramps detachably secured at the opposite side of said main frame and at the sides of said bogie frames remote from said main frame for enabling a vehicle to be driven onto and off said rolls.

25. Power absorption means comprising: a hydraulic brake unit having an inlet and an outlet; a heat exchanger; conduit means interconnecting said hydraulic brake unit and heat exchanger arranged to provide a closed circulating system for said brake liquid; a storage tank for said brake liquid; a first conduit connecting said storage tank with the inlet of said hydraulic brake unit; a loading valve connected in said first conduit for controlling the flow of liquid from said storage tank to said hydraulic brake unit, said storage tank being disposed at an elevation higher than said hydraulic brake unit so that liquid can flow from said storage tank to said hydraulic brake unit by gravity when said valve is open; a second conduit communicating at one end thereof with the outlet of said hydraulic brake unit and communicating at its opposite end with said storage tank, and an unloading valve connected in said second conduit for controlling the flow of liquid from said hydraulic brake unit to said storage tank, whereby said hydraulic brake unit can unload itself by forcing liquid into said storage tank when said unloading valve is open.

26. A device for absorbing the energy of a driven member, comprising: an idler roll and a drive roll adapted to be engaged by the driven wheels of a vehicle undergoing test; a hydraulic brake unit including a housing adapted to contain a liquid and a rotor, said housing having an inlet opening and an outlet opening; means operatively interconnecting said drive roll and said rotor; a deaerating device having an inlet opening and an outlet opening; a conduit connecting the outlet of said brake housing with the inlet of said deaerating device; a heat exchanger having an inlet and an outlet; a conduit connecting the outlet of said deaerator with the inlet of said heat exchanger; a conduit connecting the outlet of said heat exchanger with the inlet of said brake housing, said deaerating device also having an outlet for the air separated from said brake liquid; and a conduit connecting said air outlet with said brake housing for returning the separated air to said brake housing.

27. Dynamometer apparatus comprising: a hydraulic brake unit including a housing adapted to contain brake liquid; a rotor in said housing, said housing having an inlet opening and an outlet opening for said brake liquid; a deaerating device having an inlet opening and an outlet opening; means connecting the outlet of said brake housing with the inlet of said deaerating device; a heat exchanger having an inlet and an outlet; means connecting the outlet of said deaerating device with the inlet of said heat exchanger; means connecting the outlet of said heat exchanger with the inlet of said brake housing, said deaerating device also having an outlet for the air separated from said brake liquid; and means connecting said air outlet with the brake housing for returning the separated air and any moisture entrained therein to said brake housing.

28. Dynamometer apparatus comprising: a hydraulic brake unit including a housing adapted to contain brake liquid, said housing having an inlet opening and an outlet opening; a deaerating device having an inlet opening and an outlet opening; means establishing communication between the outlet of said hydraulic brake unit and the inlet of said deaerating device, said deaerating device also having an outlet for the air separated from said brake liquid; and means establishing communication between said air outlet and said brake housing for returning the separated air and any moisture entrained therein to said brake housing.

29. Portable dynamometer apparatus comprising: a main frame; a plurality of pairs of rolls mounted in said frame; a pair of bogie frames hingedly connected to one side of said main frame and adapted to be swung over on top of said main frame when not in use; a plurality of rolls mounted in each of said bogie frames; a pair of brackets mounted upon each of said bogie frames on the side thereof remote from said main frame; two pairs of brackets mounted upon the opposite side of said main frame, each of said brackets being provided with a notch at its upper end; and a ramp associated with each pair of brackets, each of said ramps having a pair of pins adapted to be received in the notches in its associated pair of brackets to detachably connect the ramp with the brackets.

References Cited in the file of this patent

UNITED STATES PATENTS

| 108,812 | Morgan | Nov. 1, 1870 |
| 1,155,126 | Bond | Sept. 28, 1915 |
| 1,212,311 | Bailey | Jan. 16, 1917 |
| 1,440,808 | Wineman | Jan. 2, 1923 |
| 1,452,783 | Bishop | Apr. 24, 1923 |
| 1,538,164 | Buell | May 19, 1925 |
| 1,632,994 | Burgess | June 21, 1927 |
| 1,642,095 | Tracy | Sept. 13, 1927 |
| 1,743,409 | Tracy | Jan. 14, 1930 |
| 1,859,607 | Sinclair | May 24, 1932 |
| 1,915,547 | North et al. | June 27, 1933 |
| 1,992,910 | De la Mater | Feb. 26, 1935 |
| 2,006,948 | Hazard et al. | July 2, 1935 |
| 2,039,428 | Lewis | May 5, 1936 |
| 2,047,854 | Clymer | July 14, 1936 |
| 2,116,992 | Weaver | May 10, 1938 |
| 2,130,833 | Bennett | Sept. 20, 1938 |
| 2,144,010 | Bennett | Jan. 17, 1939 |
| 2,147,993 | Scheibe | Feb. 21, 1939 |
| 2,160,092 | Smalley | May 30, 1939 |
| 2,189,189 | Bennett | Feb. 6, 1940 |
| 2,248,938 | Bennett | July 15, 1941 |
| 2,251,911 | Bennett | Aug. 12, 1941 |
| 2,287,130 | Ramey | June 23, 1942 |
| 2,341,122 | Schmidt | Feb. 8, 1944 |
| 2,372,704 | Bennett | Apr. 3, 1945 |
| 2,452,550 | Cline | Nov. 2, 1948 |

FOREIGN PATENTS

| 16,921 | Great Britain | 1904 |
| 448,220 | France | Nov. 20, 1912 |
| 537,867 | Germany | Nov. 7, 1931 |
| 609,266 | Germany | Feb. 11, 1935 |
| 673,702 | Germany | Mar. 27, 1939 |